United States Patent
Kawai et al.

(10) Patent No.: US 7,272,361 B2
(45) Date of Patent: Sep. 18, 2007

(54) METHOD AND DEVICE FOR TRANSMITTING BURST SIGNAL IN MOBILE COMMUNICATION SYSTEM, INFORMATION DISTRIBUTION METHOD, AND INFORMATION DISTRIBUTION CONTROLLER

(75) Inventors: Hiroyuki Kawai, Yokosuka (JP); Hirohito Suda, Yokosuka (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1103 days.

(21) Appl. No.: 09/926,068

(22) PCT Filed: Dec. 25, 2000

(86) PCT No.: PCT/JP00/09193

§ 371 (c)(1), (2), (4) Date: Dec. 12, 2001

(87) PCT Pub. No.: WO01/48952

PCT Pub. Date: Jul. 5, 2001

(65) Prior Publication Data

US 2003/0036361 A1  Feb. 20, 2003

(30) Foreign Application Priority Data

Dec. 24, 1999 (JP) .................................. 11-368466
Dec. 28, 1999 (JP) .................................. 11-375804

(51) Int. Cl.
  *H04B 1/00* (2006.01)
  *H04B 7/00* (2006.01)

(52) U.S. Cl. ................... 455/69; 455/39; 455/63.1; 455/67.13; 455/68

(58) Field of Classification Search .................. None
See application file for complete search history.

(56) References Cited

U.S. PATENT DOCUMENTS 5,339,317 A * 8/1994 Tanaka et al. .............. 370/460

(Continued)

FOREIGN PATENT DOCUMENTS

JP       1-029030       1/1989

(Continued)

OTHER PUBLICATIONS

S. V. Hanly, IEEE Transactions on Communications, vol. 47, No. 3, pp. 426-437, XP-000802084, "Congestion Measures in DS-CDMA Networks", Mar. 1999.

*Primary Examiner*—Duc M. Nguyen
*Assistant Examiner*—Matthew Genack
(74) *Attorney, Agent, or Firm*—Oblon, Spivak, McClelland, Maier & Neustadt, P.C.

(57) ABSTRACT

In a method and an apparatus of transmitting a burst signal when the burst signal is transmitted from a transmitting station to a receiving station at a transmission power value and/or a transmission rate determined in accordance with a state of a radio channel between the transmitting and receiving station in a mobile communication system, based on a comparison result between a criterion predetermined according to a state of the radio channel and/or a transmission waiting state of the signal, whether or not the burst signal is to be transmitted is determined, and, when it is determined that the burst signal is to be transmitted, the burst signal is transmitted from the transmitting station to the receiving station.

45 Claims, 18 Drawing Sheets

U.S. PATENT DOCUMENTS

| | | |
|---|---|---|
| 5,721,733 A | 2/1998 | Wang et al. |
| 5,812,935 A | 9/1998 | Kay |
| 5,914,950 A | 6/1999 | Tiedemann, Jr. et al. |
| 5,920,817 A | 7/1999 | Umeda et al. |
| 5,995,496 A | 11/1999 | Honkasalo et al. |
| 6,469,991 B1 * | 10/2002 | Chuah ................ 370/329 |
| 6,542,718 B1 * | 4/2003 | Kuo et al. ................ 455/69 |
| 6,567,459 B1 * | 5/2003 | Hakkinen et al. ........... 375/132 |
| 6,763,007 B1 * | 7/2004 | La Porta et al. ............ 370/331 |

FOREIGN PATENT DOCUMENTS

| | | |
|---|---|---|
| JP | 5-41687 | 2/1993 |
| JP | 8-186605 | 7/1996 |
| JP | 9-247731 | 9/1997 |
| JP | 9-252480 | 9/1997 |
| JP | 10-56420 | 2/1998 |
| JP | 11-18130 | 1/1999 |
| JP | 11-55747 | 2/1999 |
| JP | 11-69457 | 3/1999 |
| JP | 11-205342 | 7/1999 |
| JP | 11-313358 | 11/1999 |
| WO | WO98/48530 | 10/1998 |
| WO | WO96/66755 | 12/1999 |

* cited by examiner

METHOD AND DEVICE FOR TRANSMITTING BURST SIGNAL IN MOBILE COMMUNICATION SYSTEM, INFORMATION DISTRIBUTION METHOD, AND INFORMATION DISTRIBUTION CONTROLLER

TECHNICAL FIELD

The present invention relates to a method of transmitting a burst signal in a mobile communication system, and an apparatus therefor, and, in detail, to a method of transmitting a burst signal in a case where the burst signal is transmitted from a transmitting station to a receiving station at a transmission power value and/or transmission rate value determined in accordance with a state of a channel between the transmitting station and receiving station in a mobile communication system, and a transmission device which transmits the burst signal to the receiving station at such a transmission power value and/or transmission rate value. Further, the present invention relates to a information distributing method to which the above-mentioned method of and apparatus for transmitting the burst signal can be applied.

BACKGROUND ART

In a mobile communication system, when a burst signal is transmitted/received between many base stations disposed in a service area and a mobile station, a position and a radio transmission/reception state of which change every moment, it is an important problem how an appropriate base station is selected, how an appropriate transmission power is to be determined, how a transmission rate in adaptive modulation is determined, and how transmission of the burst signal (data) is performed at an appropriate time, for reducing a peak transmission power and increasing a system capacity. Especially, in a multimedia communication for which data amount, required performance and quality vary variously, it has become an important problem to distribute, in response to a transmission request, a necessary and sufficient resource (power resource, frequency resource, and so forth) to each communication, and, thereby, to achieve guarantee of service and increase in user capacity.

Transmission of the burst signal in a conventional mobile communication system is performed as follows: That is, burst signals provided to a transmitting station (for example, a base station) are stored in a waiting row, one by one, the burst signals in this waiting row are taken without delay, and a thus-taken burst signal is transmitted to a receiving station (for example, a mobile station) at an immediate following transmission occasion (timing of a slot, or the like). Thereby, the burst signals provided to the transmitting station one by one are transmitted to the receiving station in a manner such that the delay becomes minimum.

Further, according to the conventional mobile communication system, a transmission power value and/or a transmission rate value are determined in accordance with a state of a channel between a transmitting station and a receiving station. That is, the channel state between the transmitting station and receiving station (for example, a signal attenuation factor depending on a distance between the transmitting station and receiving station, or the like) is measured, and, based on the measured value, the transmission power value and/or transmission rate value are determined in a manner such that the receiving station can receive the signal at a predetermined reception quality (for example, a reception level). As a result of the transmission power value and/or transmission rate value of the burst signal to be transmitted from the transmitting station to the receiving station being thus determined, the receiving station can always receive the burst signal with the predetermined reception quality even when the mutual positional relationship between the transmitting station and receiving station, the attenuation characteristic of transmission wave, and so forth vary variously due to a movement of the mobile station, change in the selected base station, and so forth.

In the mobile communication system in which the burst signal is thus transmitted from the transmitting station to the receiving station at the transmission power value and/or transmission rate value determined in accordance with the state of the radio channel between the transmitting station and receiving station, in a conventional method of transmitting the burst signal in which a transmitting time is determined in a manner such that delay of the burst signal provided to the transmitting station is minimum, there is a case where, at the time at which the transmission should be performed, the state of the channel is not satisfactory (for example, the fading comes to be degraded too much, or the like), the transmission power value determined in accordance with this state becomes too large. In such a case, if the burst signal is transmitted at the thus-determined transmission power value, the peak transmission power becomes larger, and, thereby, the power consumption in the transmitting station increases. Further, due to increase of the average transmission power value caused by the increase of the peak transmission power value, the interference to communication of other mobile stations becomes larger.

Thus, in the conventional method of transmitting the burst signal, a time at which the burst signal is to be transmitted is determined merely in a manner such that the delay becomes minimum, without consideration of the state of radio channel between the transmitting station and receiving station. Thereby, the transmission power value and/or transmission rate value determined in accordance with the state of radio channel do not necessarily become appropriate ones when the burst signal is transmitted.

Further, in such a mobile communication system, distribution of information to a mobile set is performed as follows:

Periodically, path losses (or an average thereof) of channels between a mobile set and a plurality of base stations are measured, and one base station having the minimum measured value is selected. Then, data is distributed to the mobile set from the thus-selected base station wirelessly.

The period of selecting the above-mentioned base station can be set to a relatively long one (for example, several seconds), or can be set to a relatively short one (for example, several milliseconds). When this period is set to a relatively long one, data is distributed to the mobile set substantially from the base station which is nearest from the current position of the mobile set. Thereby, it is possible to perform data distribution with an averagely stable condition. When the above-mentioned period is set to a relatively short one, one base station which has the minimum instantaneous path loss is selected one by one every minute time interval. Thereby, in a mobile communication system in which transmission power control is performed in a manner such that the reception level at a mobile set is approximately fixed, it is possible to reduce the average transmission power.

When the period of selecting the base station by which transmission is performed to the mobile set is thus relatively long, information is distributed to the mobile set from the single base station for a relatively long time interval.

Accordingly, the information distributing which is performed from the single base station to the mobile set for a relatively long time interval is likely to be affected by a randomly occurring instantaneous variation in fading. For example, when the path loss in the radio channel between the mobile set and the relevant base station instantaneously increases (instantaneous increase of fading), the error rate of received information in the mobile set may increase, or instantaneously the transmission power may increase so as to compensate for this path loss.

Thus, when the period of selecting the base station by which transmission is performed to the mobile set is relatively long, reception of information at the mobile set is performed not necessarily in a satisfactory condition.

Further, when the period of selecting the base station which should perform transmission to the mobile set is relatively short as mentioned above, it is necessary to perform processing such as measurement of path loss, selection of the base station based on the measured value within a relatively short period, and so forth. Accordingly, the control amount required for the information distribution increases.

Therefore, an object of the present invention is to provide a method of and a device for transmitting a burst signal by which a transmission time of the burst signal can be determined such that, when the burst signal is transmitted, the transmission power value and/or transmission rate value determined in accordance with a state of the radio channel becomes not an inappropriate one for the mobile communication system as possible.

Further, the present invention has an object to provide an information distributing method for a mobile communication system by which, while the control amount required for information distribution can be reduced as possible, reception of information by a mobile set can be performed at a state which is as good as possible, and also, an information distribution control device by which, while the control amount required for information distribution can be reduced as possible, reception of information by a mobile set can be performed at a state which is as good as possible.

DISCLOSURE OF THE INVENTION

The above-mentioned problems can be solved by the following present invention:

(1) In a method of transmitting a burst signal when the burst signal is transmitted from a transmitting station to a receiving station at a transmission power value and/or transmission rate determined in accordance with a state of a radio channel between the transmitting station and receiving station in a mobile communication system, a configuration is made such that it is determined as to whether or not the burst signal is to be transmitted based on a comparison result between a criterion previously determined in accordance with the state of the radio channel and/or a transmission waiting state of the signal and the state of the radio channel between the transmitting station and receiving station; and the burst signal is transmitted from the transmitting station to the receiving station when it has been determined that the burst signal is to be transmitted.

In this method of transmitting a burst signal, when it is determined that the burst signal is to be transmitted based on a comparison result between a criterion previously determined in accordance with the state of the radio channel and/or a transmission waiting state of the signal and the state of the radio channel between the transmitting station and receiving station, the burst signal is transmitted from the transmitting station to the receiving station at the transmission power value determined in accordance with the state of the radio channel.

According to this method of transmitting a burst signal, the comparison result between the above-mentioned criterion and the state of the radio channel reflects the state of the radio channel. Thereby, a time of transmission of the burst signal (whether or not the burst signal is to be transmitted) is determined in consideration of the state of the radio channel.

The above-mentioned transmitting station may be either one of a base station and a mobile station of the mobile communication system. When the base station is the transmitting station, the mobile station is the receiving station. When the mobile station is the transmitting station, the base station is the receiving station.

The above-mentioned criterion is determined such that the transmission power value and/or transmission rate determined based on the state of the radio channel at the time of transmitting the burst signal determined based on the comparison result between the criterion and the state of the radio channel is not inappropriate for the mobile communication system as possible. Further, this criterion may be made variable adaptively for each time zone, each mobile station performing communication, or each base station performing communication.

(2) In a standpoint that the state of the radio channel can be directly determined, in the above-mentioned method of transmitting of a burst signal, the above-mentioned criterion may be determined based on th state of the radio channel.

The state of the radio channel which is used as a base for determining the above-mentioned criterion represents the transmission state of the burst signal directly or indirectly, and, for example, may be expressed by any of instantaneous path loss variation value between the transmitting and receiving stations, data transmission error rate, transmission throughput, distance between the transmitting and receiving stations, relative positional relationship between the transmitting and receiving stations, interference power value which the receiving station receives from another transmitting station, number of receiving stations on the other ends to which the burst signal is transmitted through a same antenna, desired time of transmission, transmission data amount, and/or the like, short-span average thereof, long-span average thereof, reception-end transmission permission/non-permission determination determined on the receiving device, or a combination of some thereof. These can be obtained by direct measurement in the transmitting device, or may be obtained as a result of one measured in the reception device being transmitted as a control signal. When the measurement is made in the receiving device, the measured value may be transmitted to the transmitting device in a form of a real number or the like as it is as a control signal, or determination may be made therefor based on a criterion provided in the receiving end, and one expressed by a numerical value in binary or more finite levels may be transmitted to the transmitting device as a reception-end transmission permission/non-permission determination.

(3) In a case where it is determined as to whether or not the burst signal is to be transmitted in consideration of the state of the radio channel, and, based on the determination result, the burst signal is transmitted, a waiting time for the burst signal is long when an amount of the burst signal provided to the transmitting station as the burst signals to be transmitted is large. Such a situation is not an appropriate state for the mobile communication system. Therefore, in a standpoint of avoiding such a situation, the determination as to whether or not the burst signal is to be transmitted may be performed further depending on the transmission waiting state of the burst signal, according to the present invention.

In this method of transmitting a burst signal, as the determination as to whether or not the burst signal is to be transmitted is made depending on the waiting state of the burst signal, it is possible to transmit the burst signal provided to the transmitting station without delay as possible while maintaining the transmission power value and/or transmission rate as an appropriate state as possible.

The above-mentioned waiting time for the burst signal represents a waiting state until the burst signal provided to the transmitting station is transmitted, directly or indirectly, and, for example, may be expressed by any of or a combination of some of a data amount of the burst signal in the waiting state, the maximum delay time of the burst signal in the waiting state, the average delay time of the burst signal in the waiting state and an immediately preceding transmission situation.

(4) As the above-mentioned determination as to whether or not the burst signal is to be transmitted is made based on the comparison result between the above-mentioned criterion and the state of the radio channel, the above-mentioned waiting state of the burst signal may be reflected by either the above-mentioned criterion or the state of the radio channel. In a standpoint that the waiting state of the burst signal can be easily reflected by the determination as to whether or not the burst signal is to be transmitted, the above-mentioned criterion may be determined depending on the transmission waiting state of the burst signal, in the method of transmitting of a burst signal, according to the present invention.

(5) When data is transmitted as the burst signal, various performances are required for transmission of the burst signal. In a standpoint that such requirements can be properly dealt with, according to the present invention, the determination as to whether or not the burst signal is to be transmitted may be performed further depending on performances required for transmitting the burst signal, in the method of transmitting of a burst signal.

As the determination as to whether or not the burst signal is to be transmitted is thus performed further depending on performances required for transmitting the burst signal, it is possible to transmit the burst signal in a manner such as to satisfy the required performances, while maintaining the transmission power value and/or transmission rate as an appropriate state as possible. For example, for the burst signal of data for which relatively fast transmitting rate is required, even when the radio transmission state is somewhat unsatisfactory, the burst signal may be transmitted by the burst signal at the transmission power value/transmission rate in accordance with this state.

The performances required for transmitting the burst signal represents performances required when the burst signal is transmitted, and, for example, may be expressed by any of or a combination of some of required transmission rate, required transmission priority level, required error rate, required maximum delay amount, and required average delay amount.

(6) As the above-mentioned determination as to whether or not the burst signal is to be transmitted is made based on the comparison result between the above-mentioned criterion and the state of the radio channel, the above-mentioned performances required for transmitting the burst signal may be reflected by either the above-mentioned criterion or the state of the radio channel. In a standpoint that the performances required for transmitting the burst signal can be easily reflected by the determination as to whether or not the burst signal is to be transmitted, the above-mentioned criterion may be determined depending on the performances required for transmitting the burst signal, in the method of transmitting of a burst signal, according to the present invention.

(7) Further, in a standpoint that the power resource can be distributed in accordance with the performances required for transmitting the burst signal, at least one of the transmission power value and transmission rate may be determined further depending on the performances required for transmitting the burst signal.

(8) In comparison between the above-mentioned criterion and the state of the radio channel, originally, the transmission power value and/or transmission rate is determined based on the state of the radio channel. Accordingly, in a standpoint that processing can be performed easily, a configuration may be made such that the criterion is expressed as a reference transmission power value and/or reference transmission rate, and, it is determined as to whether or not the burst signal is to be transmitted based on the comparison result between the reference transmission power value and/or reference transmission rate and transmission power value and/or transmission rate determined in accordance with the state of the radio channel, according to the present invention.

(9) In cellular mobile communication, in order to reduce interference power to other cells, it is needed to provide an upper limit to the total of transmission powers from one base station. In this case, it is needed to consider states of a plurality of radio channels (for example, a total transmission power value). In this standpoint, the above-mentioned state of the radio channel may include not only the state of the radio channel between the transmitting station and receiving station to which the burst signal is addressed but also the state of a radio channel with another receiving station.

For example, the above-mentioned criterion is a reference total power value, and bursts which can be transmitted are selected from a plurality of burst signals such that the total of transmission power values of the plurality of burst signals do not exceed the above-mentioned reference total power value. In this selection, for example, burst signals are selected from the plurality of burst signals in a predetermined order, the total of transmission power values thereof is obtained, and, determination is made such that, when this total does not exceed the above-mentioned reference total power value, the thus-selected burst signals can be transmitted.

(10) Further, in order to solve the above-mentioned problem, according to the present invention, in a transmitting device in a mobile communication system in which a burst signal is transmitted to a receiving station at a transmission power value and/or transmission rate determined in accordance with a state of a radio channel between the transmitting station and receiving station in a mobile communication system, transmission permission criterion determining means which determines a transmission permission criterion of the burst signal, determining means which determines as to whether or not the burst signal is to be transmitted based on a comparison result between the transmission permission criterion determined by the transmission permission criterion detecting means and the state of the radio channel with the receiving station, and transmission control means which transmits the burst signal to the receiving station when it has been determined by the determining means that the burst signal is to be transmitted, are provided.

(11) Further, in order to solve the above-mentioned problem, according to the present invention, in a method of distributing information to a mobile set in a mobile communication system in which communication is performed between a base station and the mobile set, one or a plurality of base stations are determined to perform communication with the mobile set; information to be distributed to the mobile set is distributed to the thus-determined one or plurality of base stations; and each base station transmits the thus-distributed information to the mobile set.

In such an information distributing method in a mobile communication system, information to be distributed to a mobile set is distributed to a plurality of base stations, and, from each base station, the thus-distributed information is transmitted to the mobile set. As information to be distributed to a mobile set is distributed to a plurality of base stations, and, from each base station, the thus-distributed information is transmitted to the mobile set, it is possible to adaptively alter a mode of distributing the information by a manner of distribution of the information to be distributed, such as the state of the base stations to which the information to be distributed is distributed, the state of the radio channels between the respective base stations to which the information is distributed and the mobile set, distributing amounts of the information, or the like.

The number of the base stations to perform communication with the mobile set may be fixedly predetermined based on the disposition of the base stations, expected communication traffic, and/or the like, or may be altered appropriately based on required communication quality, required information transmission rate, states of the radio channels between the respective base stations and mobile set, and/or the like.

(12) In a standpoint that transmission of information from a base station having a better state of a radio channel with the mobile set can be made, according to the present invention, one or a plurality of base stations to perform communication with the mobile set may be determined based on a state of a radio channel with the mobile set.

The above-mentioned state of the radio channel represents a transmission state of radio wave (information) between the mobile set and base station, directly or indirectly, and, may be expressed by, for example, any of or a combination of some of instantaneous pass loss variation value in the radio channel, data transmission error rate, transmission throughput, distance between the mobile set and base station, relative positional relationship between the base station and mobile set, interference power value from another transmitting station which the radio channel receives, the number of mobile sets on the other ends to which transmission is to be made through a same antenna, required time, transmission data amount, short-span average thereof, and long-span average thereof.

(13) When information is distributed, various performances are required for the information distribution. In a standpoint that the requirements for the information distribution can be properly dealt with, according to the present invention, in the above-mentioned information distributing method in a mobile communication system, one or a plurality of base stations to perform communication with the mobile set may be determined based on performances required for transmission of the information to be distributed to the mobile set.

The performances required for transmitting the burst signal represent performances required when the burst signal is transmitted, and, for example, may be expressed by any of or a combination of some of required transmission rate, required transmission priority level, required error rate, required maximum delay amount, and required average delay amount, and so forth.

(14) According to the present invention, in a standpoint that information to be distributed can be properly distributed in accordance with an amount of information piled up in each base station, one or a plurality of base stations to perform communication with the mobile set may be determined based on a transmission waiting state of information to be distributed in each base station.

The transmission waiting state for the information to be transmitted in each base station represents a waiting state until the information provided to each base station is transmitted to the mobile set, directly or indirectly, and, for example, may be expressed by any of or a combination of some of the data amount of the information in the waiting state, the maximum delay time of the information in the waiting state, and the average delay time of the information in the waiting state.

(15) When a fixed amount of information is distributed to the mobile set, in a standpoint that an amount of information transmitted from each base station can be reduced, according to the present invention, the information to be distributed to the mobile set may be distributed to the thus-determined plurality of base stations without duplication.

In such an information distributing method in a mobile communication system, as the information to be distributed to the mobile set is distributed to the thus-determined plurality of base stations without duplication, when information is distributed to the mobile set, the amount of information transmitted from each base station can be reduced than an amount of the information in a case where the information is transmitted from a single base station. As a result, a transmission time of information of each base station when the information is transmitted to the mobile set is shortened, and information transmission from each base station to the mobile set is not likely to be subject to variation in state of radio channel which may occur randomly.

(16) In a standpoint that information distribution can be made to the mobile set more positively, according to the present invention, in the above-mentioned information distributing method in a mobile communication system, a part or all of the information to be distributed to the mobile set may be copied, and the information to be distributed to the mobile set may be distributed to the thus-determined plurality of base stations with duplication of the part or all of the information.

In such an information distributing method in a mobile communication system, as the information to be distributed to the mobile set is distributed to the thus-determined plurality of base stations with duplication of the part or all of the information, when a quality of information transmitted from any base station is degraded, the quality-degraded information can be made up with corresponding information transmitted from another base station duplicately. As a result, it is possible to perform information distribution to the mobile set more positively.

(17) In a standpoint that communication traffic of each base station can be equalized, according to the present invention, in the above-mentioned information distributing method in a mobile communication system, a larger amount of the information may be distributed to a base station of the thus-determined plurality of base stations which has a smaller amount of information in a transmission waiting state.

(18) In a standpoint that a larger amount of information can be transmitted to the mobile set through a better radio channel, a larger amount of the information may be distributed to a base station of the thus-determined plurality of base stations which has a better state of the radio channel with the mobile set.

The matter that the state of the radio channel is better means that the transmission state of radio wave (information) between the mobile set and base station is more satisfactory, and, may be expressed by, for example, respective states in that the instantaneous path loss variation value and/or short-span average thereof in the radio channel is smaller, the data transmission error rate is smaller, the transmission throughput is larger, the distance between the mobile set and base station is shorter, the interference power value from another transmitting station received by the radio channel is smaller, the number of mobile sets on the other ends to which transmission is to be made through a single antenna is smaller, and/or the like.

(19) In a standpoint that information can be distributed to the mobile set in a more appropriate state in consideration of information communication quality and information distribution time, according to the present invention, in the above-mentioned information distributing method in a mobile communication system, amounts of distributing the information to the determined plurality of base stations may be determined based on an amount of information in a transmission waiting state and a state of the radio channel with the mobile set in each base station.

From the amount of information in the transmission waiting state in each base station, a distribution time of the information can be estimated, and, also, based on the state of the radio channel between each base station and the mobile set, information communication quality can be estimated. Accordingly, when the amounts of distributing the information to the respective base stations are determined based on the amount of information in the transmission waiting state and the state of the radio channel with the mobile set in each base station, it is possible to perform information distribution in a more appropriate state in consideration of a combination of information communication quality and information distribution time.

(20) For example, the information may be distributed to the thus-determined plurality of base stations in a manner such that a base station having a better state of the radio channel with the mobile set may have a larger amount of information in a transmission waiting state. In this information distributing method in a mobile communication system, it is possible to perform information distribution in a state of better communication quality.

(21) In a standpoint that information distribution to the mobile set can be performed more quickly, according to the present invention, in the information distributing method in a mobile communication system, when a state of information piled up in a transmission waiting state in each base station becomes a predetermined state, a part or all of the information in a transmission waiting state may be collected; and the thus-collected information may be re-distributed to one or a plurality of base stations as information to be distributed.

By re-distributing the transmission waiting information which can be regarded as being not likely to be transmitted in each base station to another base station, it is possible to distribute the information to the mobile set more quickly.

The determination as to whether or not the transmission waiting information is not likely to be transmitted in each base station can be made by time out, or whether or not a vacancy situation occurs in another base station, or the like.

(22) Further, in a standpoint that a large amount of information can be distributed to the mobile set without delay, according to the present invention, in the above-mentioned information distributing method in a mobile communication system, when the above-mentioned information is collected, if a time for which the thus-collected information has been piled up without being transmitted to the mobile set is longer than a predetermined time, this collected information may be discarded.

In such an information distributing method in a mobile communication system, as information which has been piled up for a long time in each base station is discarded, it is possible to distribute information which is provided sequentially to the mobile set without delay.

(23) Further, in order to solve the above-mentioned problem, according to the present invention, in an information distribution control device performing information distribution control for a mobile set in a mobile communication system having a base station and the mobile set, base station determining means determining one or a plurality of base stations to perform communication with the mobile set; and information distributing means distributing information to be distributed to the mobile set to the thus-determined one or plurality of base stations are provided, each base station being able to transmit the information distributed by the information distributing means to the mobile set.

(24) Further, the above-mentioned problem can be solved by a transmitting device in a mobile communication system in a receiving device in the mobile communication system which transmits a burst signal transmitted from a transmitting station at a transmission power value and/or a transmission rate determined in accordance with a state of a radio channel, comprising: reception quality measuring means measuring a reception quality from a received signal; reception-end reference power determining means determining a reception-end reference power in accordance with the measured reception quality; a signal intensity detector detecting the state of the radio channel; a reception-end permission determining means determining whether or not the burst signal is to be transmitted by the transmitting station, based on a comparison result between the reception-end reference power and the state of the radio channel; and means transmitting this determination result to the transmitting station. The measurement of the radio channel can be made not only by the transmitting device but also by the receiving device. Based on communication quality measured by the receiving device, a reception-end reference power is determined, and, by a comparison result with the state of the radio channel, it is determined as to whether or not the burst signal is to be transmitted by the transmitting end, and it is sent to the transmitting end. Thereby, even the transmitting end can perform transmission of the burst signal in consideration of the state of the radio channel. Further, when also the transmitting end determines as to whether or not the burst signal is to be transmitted, and, also, takes into account the determination result of the receiving end, it is possible to perform transmission control of the burst signal with a higher accuracy.

BEST MODE FOR EMBODYING THE PRESENT INVENTION

Embodiments of the present invention will now be described based on the drawings.

Figure 1:
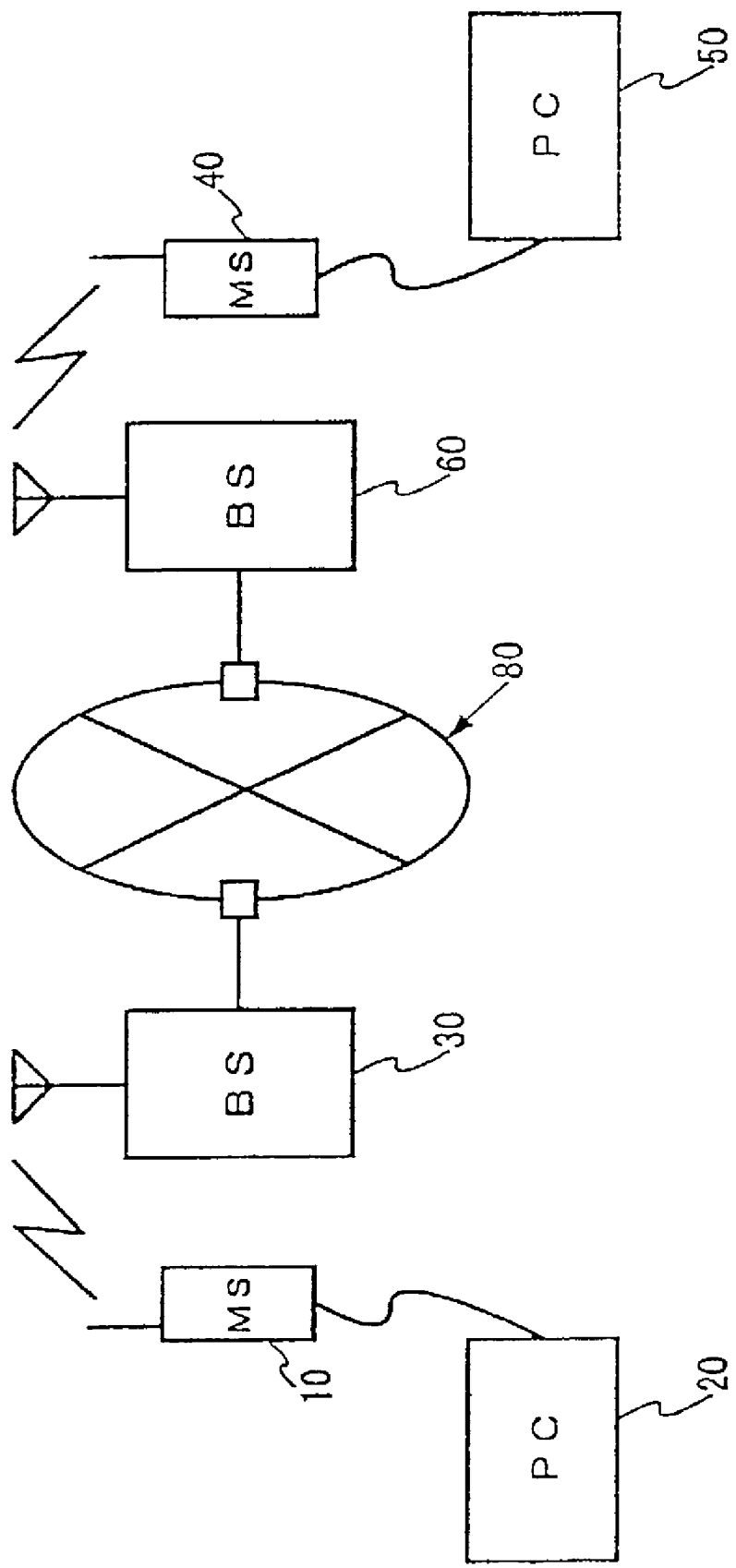
FIG. 1 is a block diagram showing a configuration example of a mobile communication system to which a method of and a device for transmitting a burst signal in embodiments of the present invention are applied.

A mobile communication system to which a method of and a device for transmitting a burst signal in the embodiments is configured, as shown in FIG. 1, for example.

In FIG. 1, to a mobile station 10 such as a portable telephone, a PHS terminal or the like, an information processing apparatus (PC) 20 such as a computer is connected. Further, the mobile station 10 performs radio communication with a base station 30 which is set in a service area for the mobile communication. Similarly, another mobile station 40 to which an information processing apparatus (PC) 50 is connected performs radio communication with another base station 60. The respective base stations 30 and 60 are connected together through a predetermined network 80.

In this mobile communication system, when data to be transmitted to the other information processing apparatus 50 from the information processing apparatus 20 is provided to the mobile station 10, for example, the mobile station 10 converts the data into a form of packets, and transmits the data in the form of packets to the base station 30 wirelessly. The base station 30 having received this burst signal sends each packet to the network 80 for the base station 60 based on a transmission destination identifier included in the packet. Then, the base station 60 having received each packet transmits the data formed in each received packet to the mobile station 40 as a burst signal. The mobile station 40 having received this burst signal transmits each packet included in the burst signal to the information processing apparatus 50. The present invention can also be applied to a system in which, instead of the information processing apparatus 20 and 50, other information generating/inputting points such as mouths and ears of human beings are used.

System of transmitting/receiving the burst signal between the mobile station 10 and base station 30, and between the base station 60 and mobile station 40 in the above-mentioned mobile communication system will now be described in detail as a first embodiment of the present invention. A first example of this transmitting/receiving system is configured as shown in FIG. 2, for example.

Figure 2:
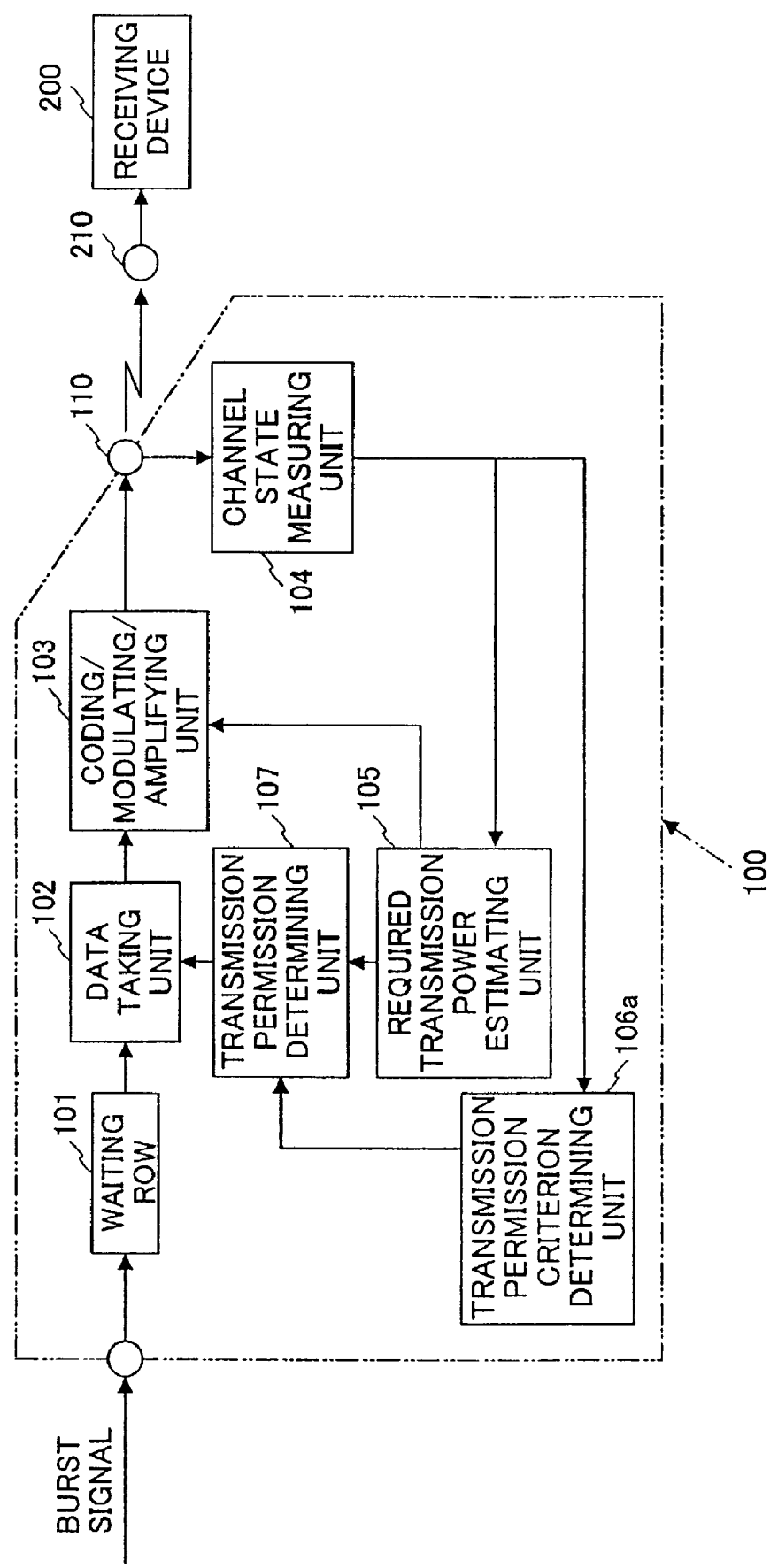
FIG. 2 is a block diagram showing a first example of a transmission/reception system in the mobile communication system in the first embodiment of the present invention.

In FIG. 2, transmission/reception of the burst signal is performed between a transmitting device 100 provided in a transmitting station end (mobile station 10 or base station 60 in the above-mentioned example) and a receiving device 200 provided in a receiving station end (base station 30 or mobile station 40 in the above-mentioned example).

The transmitting device 100 has a waiting row unit 101 in which the provided burst signal (for example, data in a form of packets) are stored one by one, a data taking unit 102 taking out data to be transmitted from the waiting row unit 101, and a coding/modulating/amplifying unit 103 performing coding, modulating and amplifying on the data to be transmitted taken by the data taking unit 102. Further, the transmitting device 100 has a channel state measuring unit 104 measuring, based on a signal received from the other communication party through an antenna 110, the state of the radio channel between the transmitting device 100 and receiving device 200, and a required transmission power estimating unit 105 estimating a transmission power value of the burst signal to be transmitted based on the state of the radio channel thus measured by the channel state measuring unit 104.

The above-mentioned channel state measuring unit 104 outputs any one or a combination of some of an instantaneous variation value of path loss, a data transmission error rate, a transmission throughput, a distance between the transmitting and receiving devices, a relative positional relationship between the transmitting and receiving devices, an interference power value from other radio stations, the number of other radio stations to which signals are to be transmitted through the antenna 110, a time at which transmission is desired to be made, an amount of data to be transmitted, and a short-span average thereof and a long-span average thereof, for example, as information representing the state of radio channel between the transmitting device 100 and receiving device 200. When the channel state measuring unit 104 outputs the instantaneous path loss variation value as the information representing the state of the relevant radio channel, for example, the required transmission power estimating unit 105 calculates a transmission power value such that a received power at the receiving device 200 may be a desired reception power value (fixed value), by multiplying the reciprocal of the above-mentioned instantaneous path loss variation value by the desired reception power value, for example. When the instantaneous path loss variation value and interference power short-span average value are output as the information representing the state of the radio channel, the required transmission power estimating unit 105 calculates a transmission power value such that the ratio of the reception power to the interference power may be a fixed value, by multiplying the reciprocal of the instantaneous path loss variation value by the interference power value short-span average value and the ratio of the desired reception power value to the interference power value, for example.

Thus, the required transmission power estimating unit 105 outputs a larger transmission power value, as the state of radio channel represented by the information obtained from the channel state measuring unit 104 is bad, but outputs a smaller transmission power value, as the state of the radio channel is good.

The transmitting device 100 further has a transmission permission criterion determining unit 106a and a transmission permission determining unit 107. The transmission permission criterion determining unit 106a calculates a reference transmission power value which is used as a transmission permission criterion based on the information representing the state of the radio channel from the channel state measuring unit 104. For example, the reference transmission power value is calculated based on information representing an average state of the radio channel from the channel state measuring unit 104 (for example, information depending on the distance between the transmitting and receiving devices, information expressed by a short-span average of the above-mentioned respective information (for example, one obtained from multiplying a short-span average value of the instantaneous path loss variation value by a fixed value). The transmission permission determining unit 107 compares the reference transmission power value determined by the transmission permission criterion determining unit 106a with the transmission power value calculated by the above-mentioned required transmission power estimating unit 105, and, outputs a control signal of permission/non-permission of transmission of the burst signal based on the comparison result. For example, the transmission power value calculated by the required transmission power estimating unit 105 is larger than the reference transmission power value due to a cause that fading decreases or the like, the transmission permission determining unit 107 outputs a control signal of non-permission of transmission of the burst signal to the data taking unit 102. On the other hand, when the state of the radio channel is relatively good, and, thus, the transmission power value calculated by the required transmission power estimating unit 105 is equal to or lower than the reference transmission power value, the transmission permission determining unit 107 outputs a control signal of permission of transmission to the data taking unit 102.

The data taking unit 102 performs control as to whether or not transmitting the burst signal, based on the control signal from the transmission permission determining unit 107. That is, while receiving the control signal of permission of transmission of the burst signal from the transmission permission determining unit 107, the data taking unit 102 takes data from the waiting row unit 101, and sends the data to the coding/modulating/amplifying unit 103. The coding/modulating/amplifying unit 103 performs coding and modifying processing on the data, and, also, performs amplifying processing thereon so that the transmission power value calculated by the required transmission power estimating unit 105 can be obtained thereby. Then, the data having undergone the respective processing is transmitted to the receiving device 200 through the antenna 110. On the other hand, while receiving the control signal of non-permission of transmission of the burst signal from the transmission permission determining unit 107, the data taking unit 102 interrupts taking of data from the waiting row unit 101. As a result, no burst signal is transmitted from the transmitting device 100.

In the above-mentioned example, when the state of the radio channel between the transmitting device 100 and receiving device 200 becomes unsatisfactory due to influence of fading or the like, transmission of the burst signal from the transmitting device 100 to the receiving device 200 is delayed until the state of the radio channel is improved. As a result, it is possible to reduce the peak transmission power, and to control the power consumption in the transmitting device 100. Also, it is possible to reduce interference to other radio stations.

Figure 3:
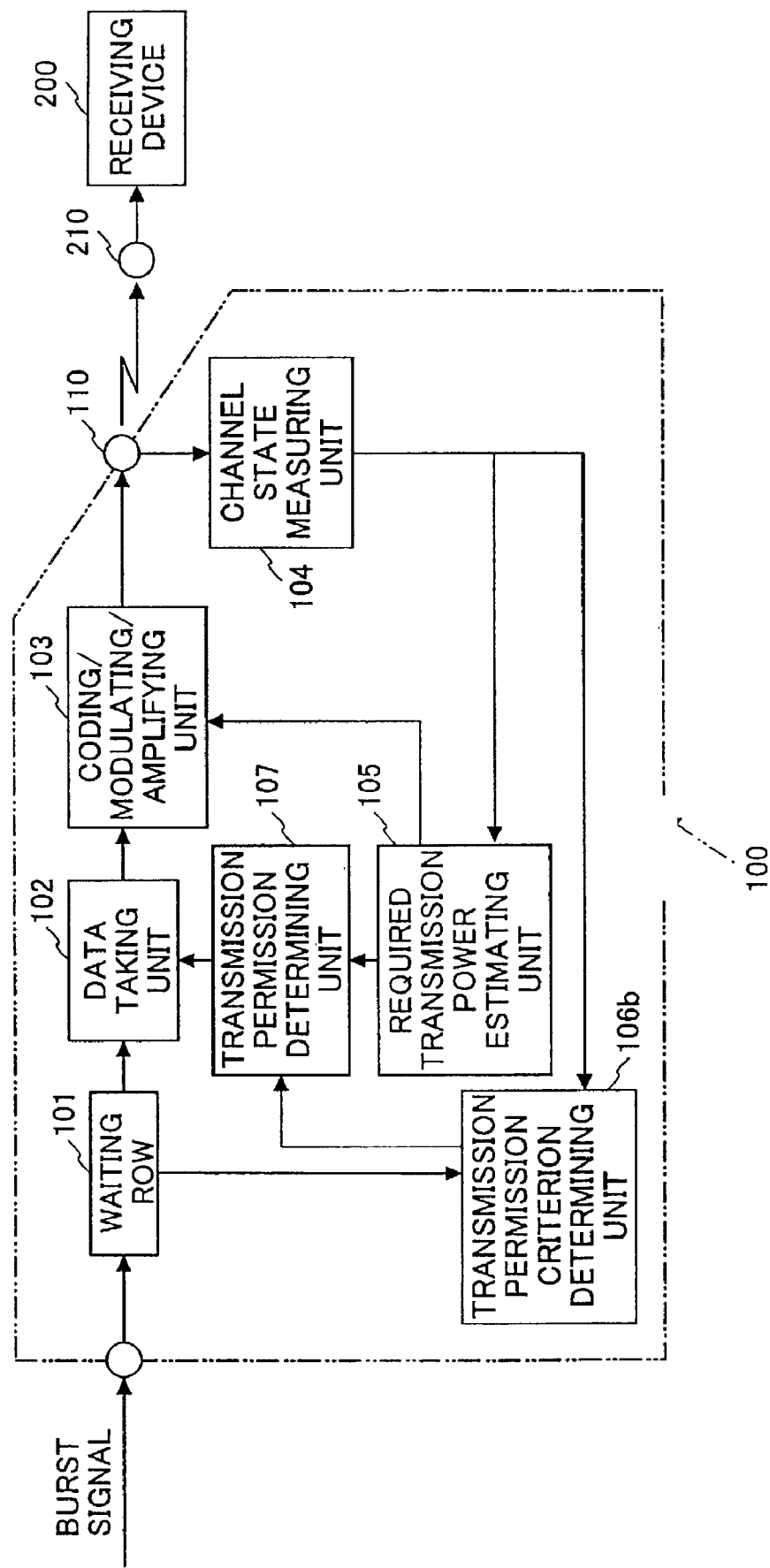
FIG. 3 is a block diagram showing a second example of a transmission/reception system in the mobile communication system in the first embodiment of the present invention.

A second example of the transmitting/receiving system in the mobile communication system shown in FIG. 1 is configured as shown in FIG. 3, for example.

In FIG. 3, a transmitting device 100 in this transmitting/receiving system (including the transmitting device 100 and a receiving device 200) includes, same as the above-described first example, a waiting row unit 101, a data taking unit 102, a coding/modulating/amplifying unit 103, a channel state measuring unit 104, a required transmission power estimating unit 105 and a transmission permission determining unit 107.

In this second example a transmission permission criterion determining unit 106b calculates a reference transmission power value which is used as a criterion for permission/non-permission of transmission of burst signal, based on information representing the state of the radio channel from the channel state measuring unit 104 and a state of the burst signal which is a waiting state of being stored in the waiting row unit 101.

For example, the transmission permission criterion determining unit 106b calculates the reference transmission power value based on the information representing the state of the radio channel from the channel state measuring unit 104 as described above, and, further, corrects the above-mentioned reference transmission power value based on the information representing a transmission waiting state of the burst signal stored in the waiting row unit 101 such as, for example, any of or a combination of some of the number of stored packets, the average delay amount thereof, and the maximum delay amount thereof. For example, as the average delay amount of the burst signal, the maximum delay amount thereof, or the number of stored packets becomes larger, the reference transmission power value calculated as mentioned above is made larger. As a result, even in the state of the radio channel in which the transmission power value should be made slightly larger, the burst signal comes to be made to be transmitted. Accordingly, the burst signal to be transmitted is prevented from being piled up in the waiting row unit 101 for a long time.

Figure 4:
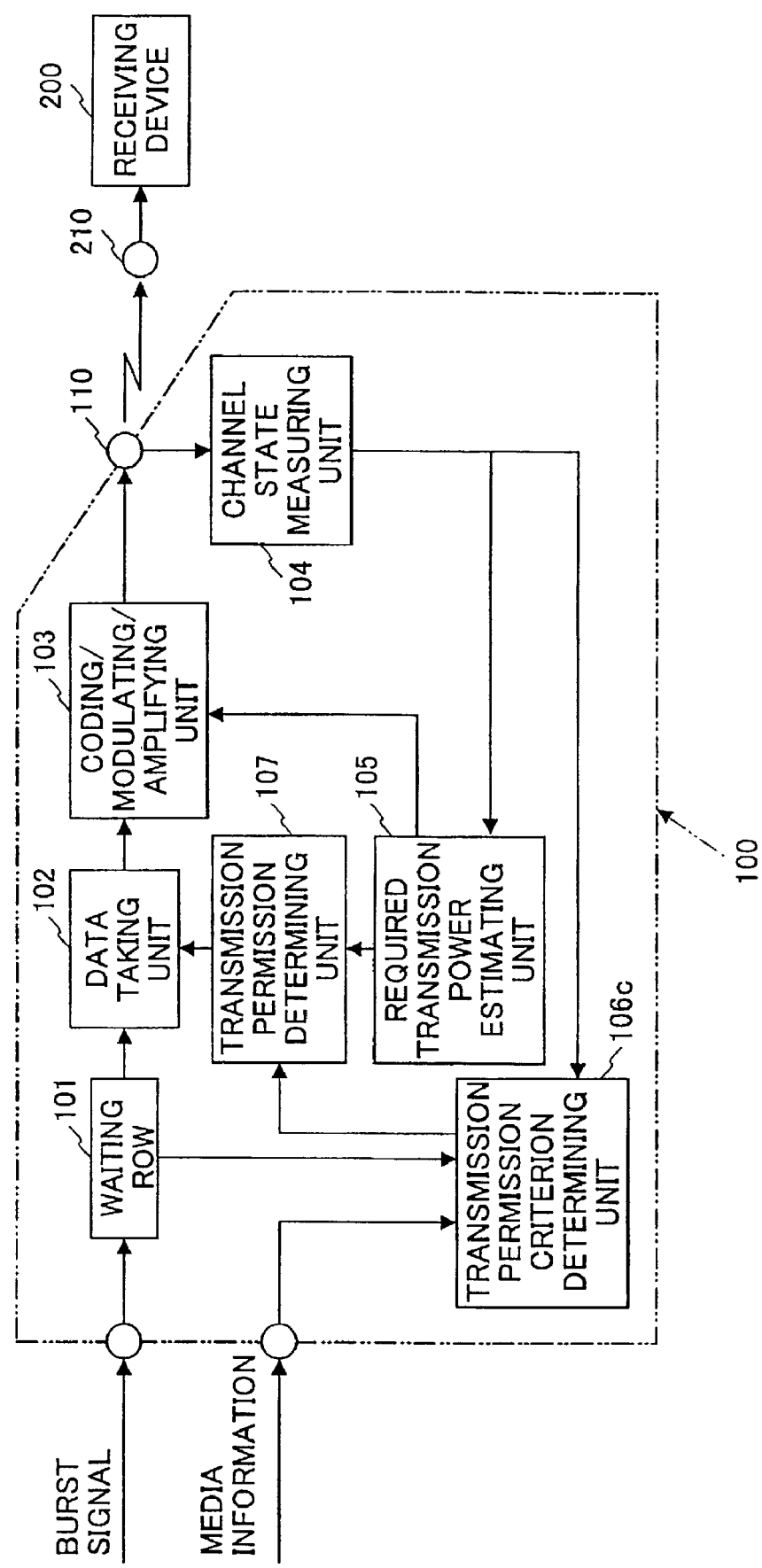
FIG. 4 is a block diagram showing a third example of a transmission/reception system in the mobile communication system in the first embodiment of the present invention.

A third example of the transmitting/receiving system in the mobile communication system shown in FIG. 1 is configured as shown in FIG. 4, for example.

In FIG. 4, a transmitting device 100 of this transmitting/receiving system (including the transmitting device 100 and a receiving device 200) includes, the same as the above-described first and second examples, a waiting row unit 101, a data taking unit 102, a coding/modulating/amplifying unit 103, a channel state measuring unit 104, a required transmission power estimating unit 105 and a transmission permission determining unit 107.

In this third example, a transmission permission criterion determining unit 106c calculates the reference transmission power value which is used as a criterion of permission/non-permission of transmission of the burst signal, based on the information representing the state of the radio channel from the channel state measuring unit 104, the state of the burst signal which is a waiting state of being stored in the waiting row unit 101, and, also, media information provided from a mother apparatus which is a supply source of the burst signals to be transmitted. The media information is performance required in transmission of information, such as, for example, a required data transmission rate, an average transmission power value, a transmission priority level, a required error rate, a required maximum delay amount, a required average delay amount and/or the like.

For example, multimedia information (including images, voices, characters and so forth) to be transmitted is provided to the transmitting device 100 as the burst signal, for example, Then, information of the performance required in transmission of the information, such as, for example, a required data transmission rate, an average transmission power value, a transmission priority level, a required error rate, a required maximum delay amount, a required average delay amount and/or the like is provided to the transmitting device 100 as the media information together with the relevant multimedia information. The transmission permission criterion determining unit 106c corrects the reference transmission power value calculated based on the state of the radio channel as described above, for example, based on the information representing the waiting state of the burst signal stored in the waiting row unit 101, and the media information. For example, when the required data transmission rate is large, when the required priority level is high, when the required error rate is low, when the required maximum delay amount or required average delay amount is small, or the like, determination is made such that the reference transmission power value becomes relatively larger. As a result, the multimedia information having such requirement can be transmitted, even in a state of the radio channel in which the transmission power value should be increased somewhat. Thus, it is possible to perform transmission of the burst signal according to the requirement.

Figure 5:
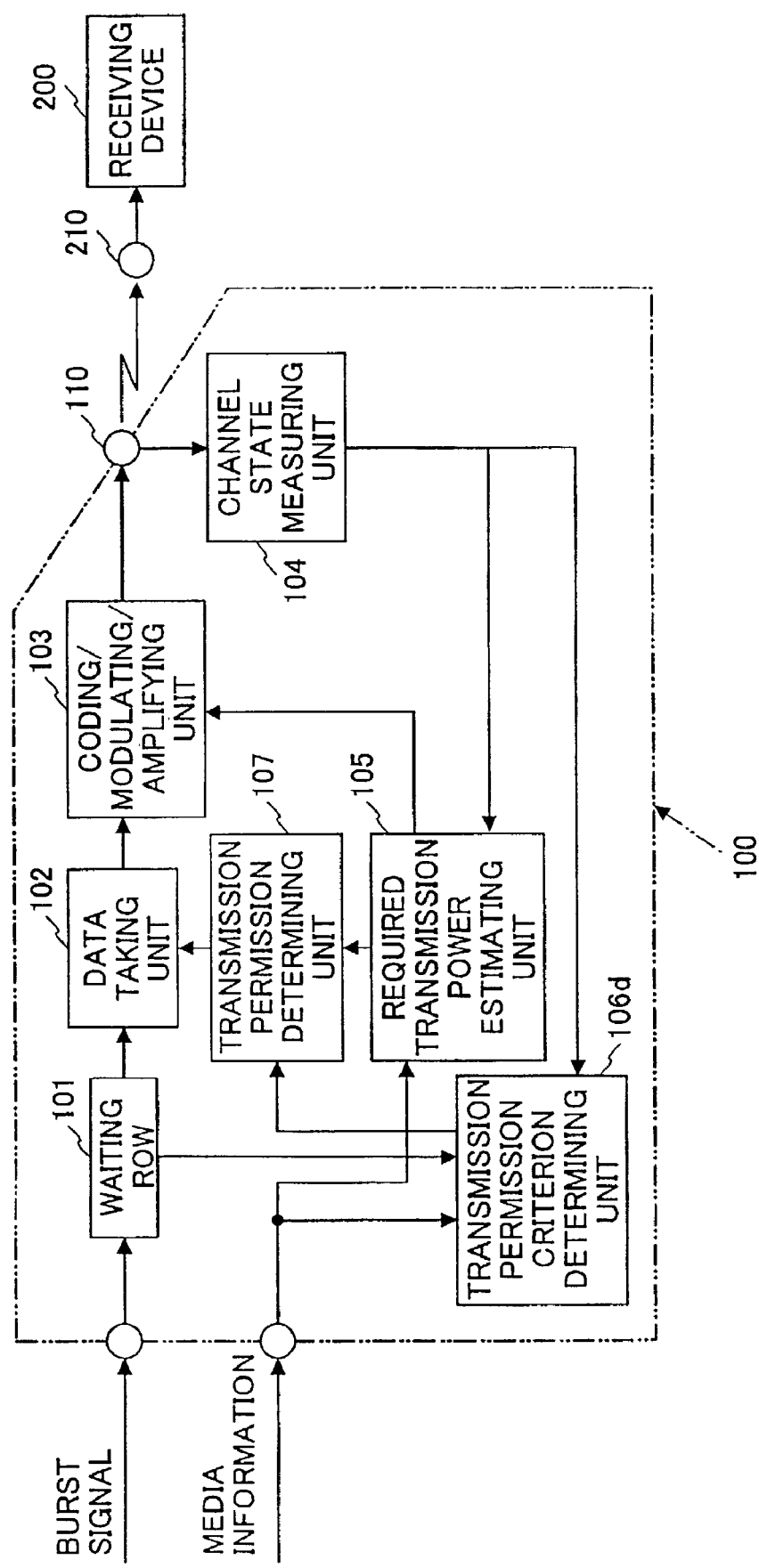
FIG. 5 is a block diagram showing a fourth example of a transmission/reception system in the mobile communication system in the first embodiment of the present invention.

A fourth example of the transmitting/receiving system in the mobile communication system shown in FIG. 1 is configured as shown in FIG. 5, for example.

In FIG. 5, a transmitting device 100 of this transmitting/receiving system (including the transmitting device 100 and a receiving device 200) includes, the same as the above-described first through third examples, a waiting row unit 101, a data taking unit 102, a coding/modulating/amplifying unit 103, a channel state measuring unit 104, a required transmission power estimating unit 105 and a transmission permission determining unit 107.

In this fourth example, a transmission permission criterion determining unit 106d calculates, same as in the above-described third example, the reference transmission power value which is used as a criterion of permission/non-permission of transmission of the burst signal, based on the information representing the state of the radio channel from the channel state measuring unit 104, the state of the burst signal which is a waiting state of being stored in the waiting row unit 101, and, also, media information provided from a mother apparatus which is a supply source of the burst signals to be transmitted. Further, the above-mentioned media information is provided to the required transmission power estimating unit 105.

The required transmission power estimating unit 105 calculates the transmission power value such that signal reception can be made with a predetermined quality in the receiving device 200, based on the information representing the state of the radio channel from the channel state measuring unit 104. Further, it corrects the thus-calculated transmission power value based on the media information for the information to be transmitted.

For example, when the required data transmission rate is large, when the required priority level is high, when the required error rate is low, when the required maximum delay amount or required average delay amount is small, or the like, the correction is made such that the transmission power value may be relatively larger. In this case, in consideration of dependency of the transmission power value calculated by the required transmission power estimating unit 105 on the media information, the transmission permission criterion determining unit 106d corrects the reference transmission power value based on the relevant media information. That is, the relevant reference transmission power value is determined based on the relevant media information so as to prevent actual transmission of the burst signal from being missed by determination as to whether or not transmission of the burst signal is permitted made by the transmission permission determining unit 107 based on comparison result between the transmission power value determined depending on the media information as mentioned above and the reference transmission power value calculated based on the relevant media information Thus, according to the fourth example, as the transmission power value is determined according to requirement for transmission of information to be transmitted, the power resource of the transmitting device 100 can be distributed properly according to the requirement for the relevant transmission of information to be transmitted.

Figure 6:
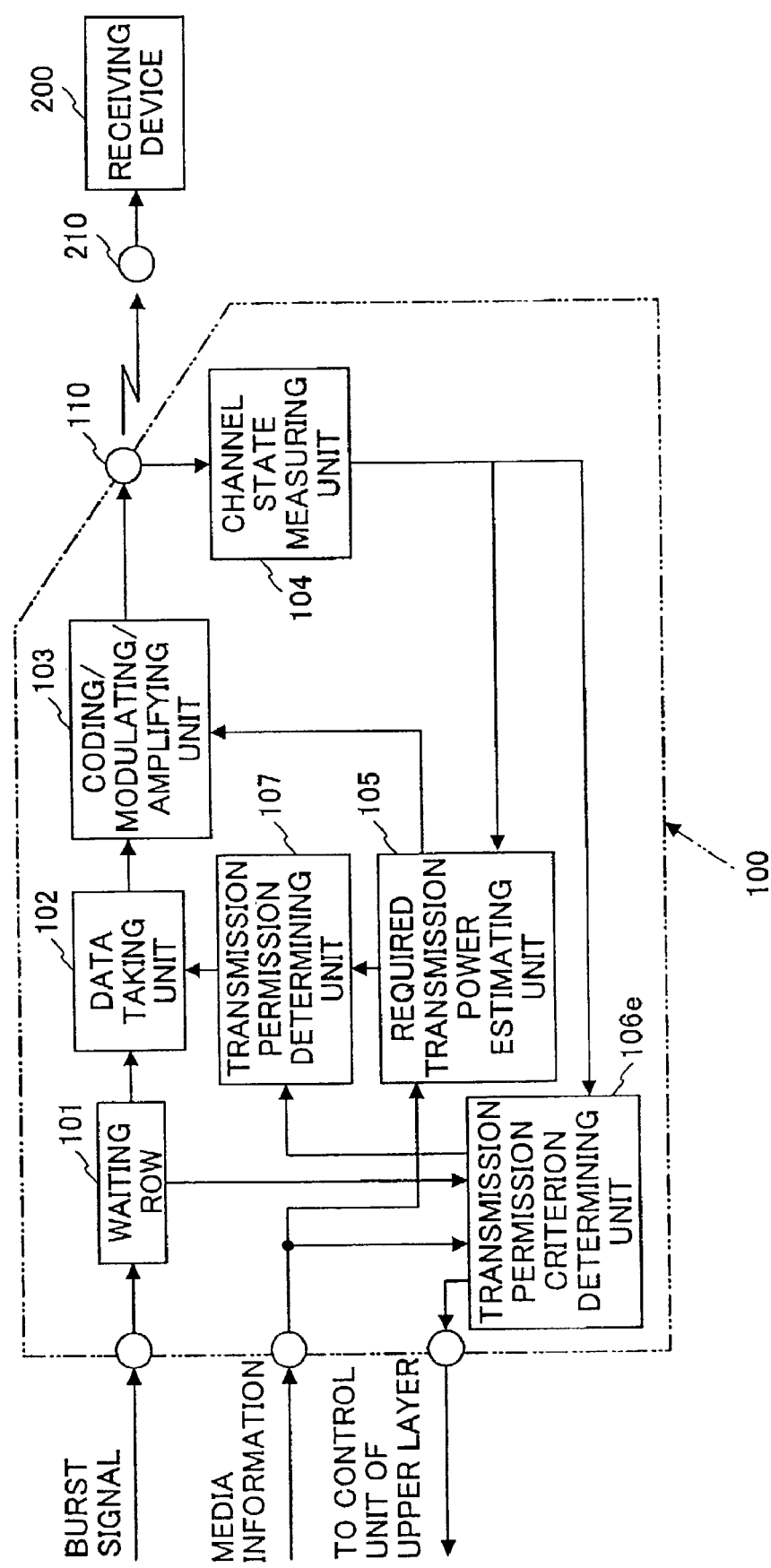
FIG. 6 is a block diagram showing a fifth example of a transmission/reception system in the mobile communication system in the first embodiment of the present invention.

A fifth example of the transmitting/receiving system in the mobile communication system shown in FIG. 1 is configured as shown in FIG. 6, for example.

In FIG. 6, a transmitting device 100 of this transmitting/receiving system (including the transmitting device 100 and a receiving device 200) includes, the same as the above-described first through fourth examples, a waiting row unit 101, a data taking unit 102, a coding/modulating/amplifying unit 103, a channel state measuring unit 104, a required transmission power estimating unit 105 and a transmission permission determining unit 107. Further, the transmission permission criterion determining unit 106e and required transmission power estimating unit 105 calculate the reference transmission power value and transmission power value, respectively, based on the above-mentioned multimedia information, same as in the above-described fourth example.

Further, in this fifth example, the transmission permission criterion determining unit 106e reports any one of or a combination of some of the provided media information, the information representing the state of waiting of transmission of the burst signal from the waiting row unit 101 and the information representing the state of the radio channel from the channel state measuring unit 104, to a mother apparatus which is a supply source of the information to be transmitted. For example, in a case where the transmitting device 100 is mounted in the mobile station 10 shown in FIG. 1, the current transmission error rate and/or length of the waiting row are reported to the information processing apparatus 20 from the transmission permission criterion determining unit 106e. The information processing apparatus 20 having received such information can perform control such as to raise the transmission priority level concerning transmission of the information to be transmitted, lower the transmission priority level concerning transmission of the other information, or lower the communication quality so as to lower the required data transmission rate. As a result, it is possible to transmit information for which various performances are required, while satisfying the requirements, without delay, and, also, in a condition in which the peak power is controlled as low as possible, from the transmitting device 100 to the receiving device 200.

In each of the above-mentioned examples, the transmission permission determining unit 107 performs determination of permission/non-permission of transmission by a single reference value (reference transmission power value). However, a method of the determination is not limited thereto. For example, a method in which a reference value for permitting transmission and a reference value for inhibiting transmission are prepared individually, a method of performing determination of permission/non-permission of transmission by using a state transition diagram, or a method of performing determination of permission/non-permission of transmission by using a neural network, may be employed. The criterion according to such a method of the determination performed by the transmission permission determining unit 107 is provided to the transmission permission determining unit 107 from the transmission permission criterion determining unit 106a (106b through 106e).

Further, in each of the above-mentioned examples, the transmission permission determining unit 107 employs the transmission power value calculated by the required transmission power estimating unit 105 calculated based on the state of the radio channel, as the information representing the state of the radio channel. However it is not limited thereto. Any of information representing the state of the radio channel obtained by the channel state measuring unit 104, or any information obtained based on the above-mentioned information can be employed. Also in this case, the transmission power permission criterion determining part 106a (106b through 106e) determines the criterion expressed by information which can be used in comparison with information provided as the information representing the state of the radio channel.

Figure 7:
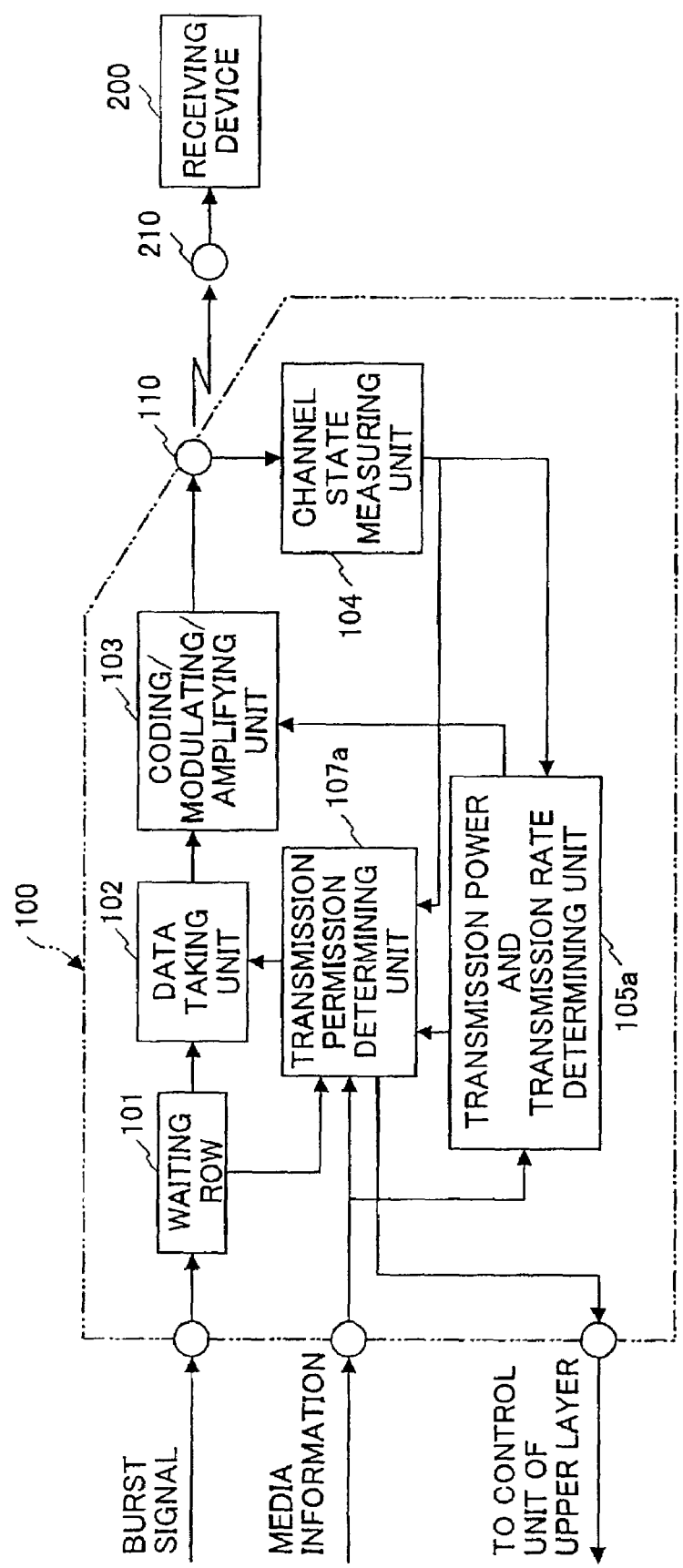
FIG. 7 is a block diagram showing a transmission/reception system in the mobile communication system in a second embodiment of the present invention.

With reference to FIG. 7, a mobile communication system to which a method of and a device for transmitting the burst signal in a second embodiment of the present invention will now be described.

In the above-described first embodiment, permission/non-permission of transmission of the burst signal is determined based on the transmission power. In contrast thereto, according to the second embodiment, permission/non-permission of transmission of the burst signal is determined by referring to, in addition to the transmission power, an adaptive modulation transmission rate. The adaptive modulation is to alter a transmission rate (transmission speed) while the transmission power transmitted between the base station and mobile station is fixed. Thereby, when the state of the radio channel becomes worse, it is possible to prevent the required transmission power from increasing, by lowering the transmission rate, according to the adaptive modulation. A transmitting device 100 of a transmitting/receiving system (including the transmitting device 100 and a receiving device 200) shown in FIG. 7 includes a waiting row unit 101, a data taking unit 102, a coding/modulating/amplifying unit 103, a channel state measuring unit 104, a transmission power and transmission rate determining unit 105a and a transmission permission determining unit 107a.

Figure 8:
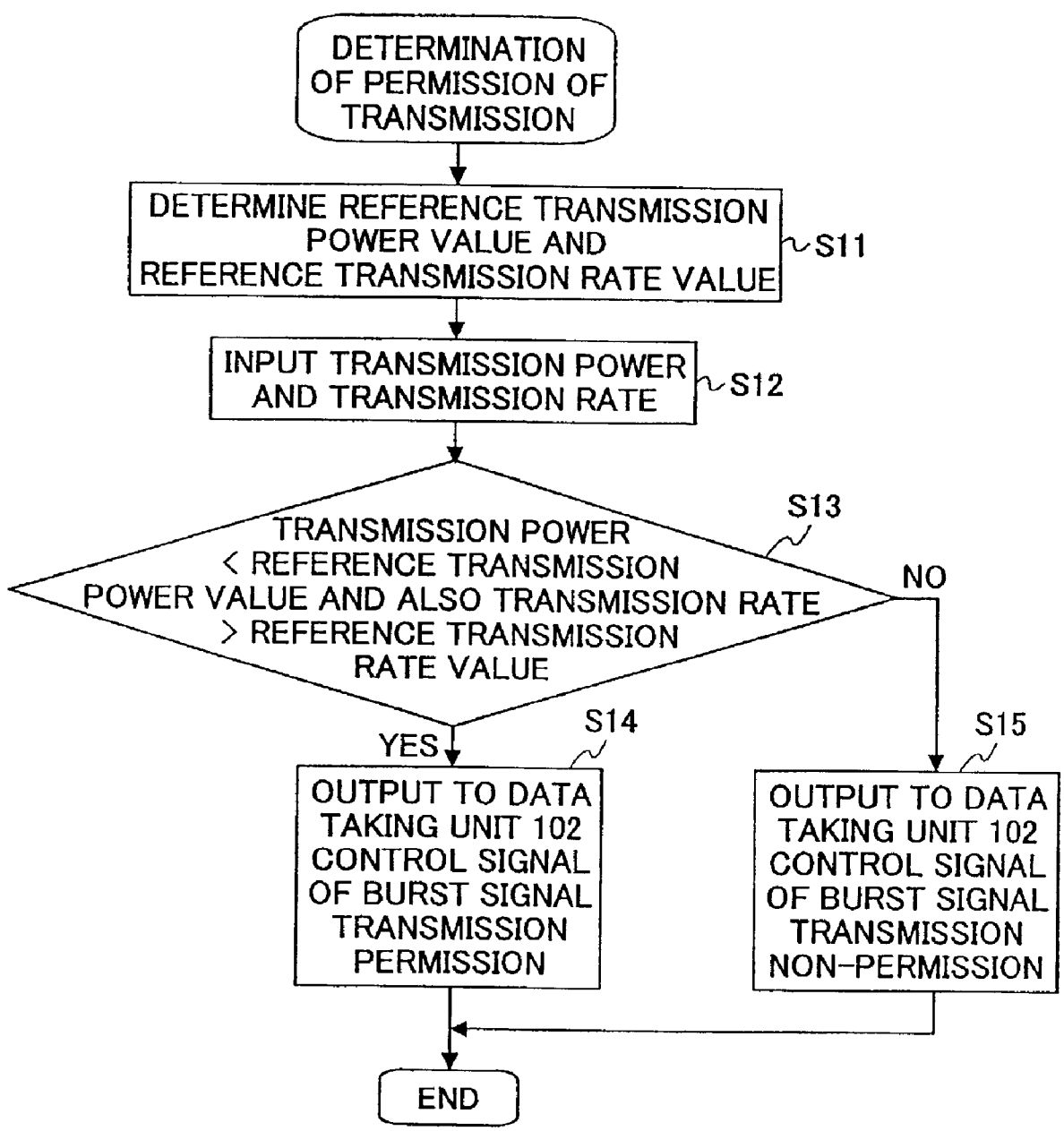
FIG. 8 is a flow chart showing operation of a transmission permission determining unit shown in FIG. 7.

FIG. 8 shows one example of an algorithm of the transmission permission determining unit determining permission/non-permission of transmission of the burst signal. The transmission permission determining unit 107a determines a reference transmission power value according to the state of the radio channel measured by the channel state measuring unit 104 and the media information, and, also, determines a reference transmission rate value according to the above-mentioned state of the radio channel (a step S11). That is, the transmission permission determining unit 107a internally includes a transmission permission reference determining unit determining the reference transmission power value and reference transmission rate. The above-mentioned processing of determining permission/non-permission of transmission is such that, as described above, based on the information representing the state of the radio channel from the channel state measuring unit 104 and the state of the burst signal which is a waiting state of being stored in the waiting row unit 101, and, also, the media information provided by a mother apparatus which is a supply source of the burst signals to be transmitted, the reference transmission power value which is a criterion of permission/non-permission of transmission of the burst signal. The media information is performance required for transmission of the information such as the required data transmission rate, average transmission power value, transmission priority level, required error rate, required maximum delay amount, required average delay amount and/or the like, for example.

Then, the transmission permission determining unit 107a inputs the transmission power value and the transmission rate determined according to the state of the radio channel and media information determined by the transmission power and transmission rate determining unit 105a (a step S12). Then, the transmission permission determining unit 107a determines whether or not the transmission power value is lower than the reference transmission power value and, also, the transmission rate is higher than the reference transmission rate (a step S13). When the transmission power value is lower than the reference transmission power value and, also, the transmission rate is higher than the reference transmission rate, the transmission permission determining unit 107a outputs a control signal of permitting transmission of the burst signal to the data taking unit 102 (a step S14), and finishes the processing. Otherwise, the transmission permission determining unit 107a outputs a control signal of not permitting transmission of the burst signal to the data taking unit 102 (in a step S15), and finishes the processing.

Thus, according to the second embodiment of the present invention, permission of transmission of the burst signal is determined by using both the transmission power and transmission rate. Thereby, slight degradation of state of the radio channel is dealt with by alteration of the transmission rate, and, then, the transmission is deferred when the channel state is further degraded. Thereby, it is possible to further effectively reduce the required transmission power.

It is also possible to determine permission of transmission of the burst signal by using only the transmission rate. In this case, the blocks 105a and 107a shown in FIG. 7 process only the transmission rate, and, in the steps S11, S12 and S13 shown in FIG. 8, only the transmission rate is processed.

The above-mentioned first and second embodiments relate to transmission of the single burst signal. That is, the transmitting device 100 transmits the burst signal to the single receiving device 200. In contrast thereto, according to a third embodiment of the present invention which will now be described, permission of transmission of a plurality of burst signals is performed unitarily. That is, according to the third embodiment, in a system in which the plurality of burst signals have information indicating destinations (transmission-destination receiving devices), respectively, and, are transmitted to the corresponding plurality of receiving devices, permission of the plurality of burst signals are managed unitarily.

Figure 9:
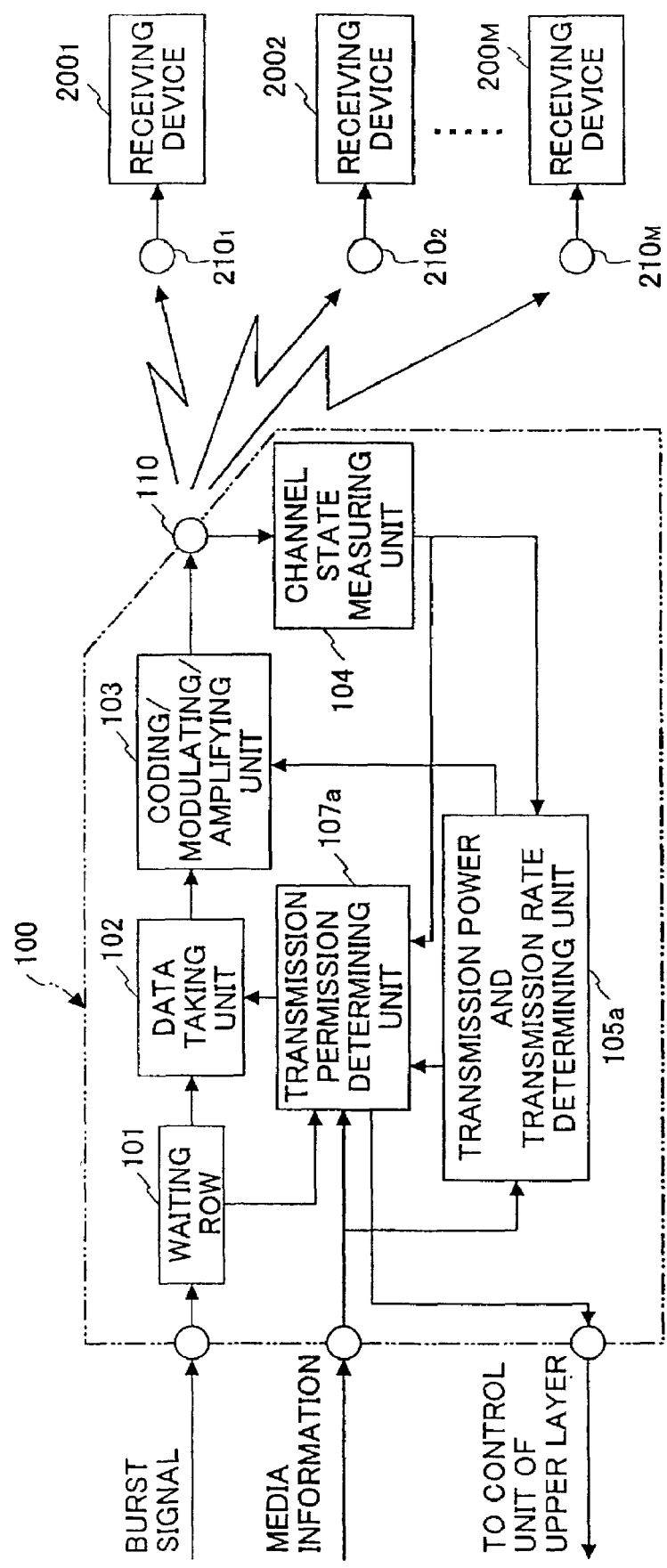
FIG. 9 is a block diagram showing a transmission/reception system in the mobile communication system in a third embodiment of the present invention.

FIG. 9 is a block diagram showing the third embodiment of the present invention. A transmitting device 100 of a transmitting/receiving system (including the transmitting device 100 and a receiving devices $200_1$ through $200_M$) shown in FIG. 9 includes a waiting row unit 101, a data taking unit 102, a coding/modulating/amplifying unit 103, a channel state measuring unit 104, a transmission power and transmission rate determining unit 105a and a transmission permission determining unit 107a. This block configuration itself is the same as that of the transmitting device 100 shown in FIG. 7. However, the transmitting device 100 shown in FIG. 9 is different from the transmitting device 100 shown in FIG. 7 in the following points:

The waiting row unit 101 can store N burst signals provided by a mother apparatus. That is, the waiting row unit 101 has N waiting rows. The transmitting device 100 can transmit, to the M receiving devices $200_1$ through $200_M$, corresponding M burst signals. That is, the respective burst signals have information indicating destination numbers, respectively. The respective receiving devices $200_1$ through $200_M$ take therein transmitted bursts addressed thereto through antennas $210_1$ through $210_M$, respectively.

In cellular mobile communication, in order to reduce interference power to another cell, there is a case where an upper limit is provided to a total of transmission power from one base station. In order to achieve it, the transmission permission determining unit 107a determines a set of transmission permission bursts such that a total of transmission powers from the transmission antenna 110 does not exceed a predetermined threshold, with reference to transmission power of each burst signal.

One example of a method for this determination will now be described.

The burst signals are seen in a predetermined order, and, when the total of the transmission powers after the media is added thereto does not exceed the threshold, transmission permission is given to the burst signal. When it exceeds the threshold, transmission of the burst signal is made not permitted. This is performed on all the media. The predetermined order is determined based on any of or a combination of some of the waiting row, media information, from the channel state measuring unit 104, and transmission power and transmission rate determining unit 105a. Examples of the predetermined order are shown below:

① The order from the media having a smaller transmission power;

② The order from the media having a larger transmission power;

③ The order from the media having a longer waiting row;

④ Based on the media information, the order from the media having a smaller delay requirement;

⑤ The order from the media having a smaller value obtained from multiplying the value of transmission power with the short-span average value of instantaneous path losses thereof;

⑥ The order from the media having a larger transmission rate; and

⑦ The order from the burst signal obtaining a more satisfactory determination from receiving-end transmission permission determination (which will be described later).

The example of the above-mentioned ② will now be given. It is assumed that the number N of burst signals is 4, transmission powers thereof (assuming the burst signals 1, 2, 3 and 4) are 0.5, 5, 3, 6, respectively, and the threshold of a total of transmission powers are 10. When they are seen in the order from a larger transmission power, the following result is obtained: First, the burst signal 4 (transmission power 6) having the largest transmission power is selected. As the total of the transmission powers is 6, it is lower than the threshold 10. Accordingly, transmission of the burst signal 4 is permitted. Then, the transmission power of the burst signal 2 having the second largest transmission power 5 is added to the transmission power 6. In this case, the total of the transmission powers is 11, and exceeds the threshold. Accordingly, transmission of the burst signal 2 is not permitted. Then, the transmission power of the burst signal 3 having the third largest transmission power is added to the transmission power 6. In this case, the total of the transmission powers is 9, and is lower than the threshold. Accordingly, in addition to the burst signal 4, transmission of the burst signal 3 is newly permitted. Then, the transmission power 0.5 of the burst signal 1 having the fourth largest transmission power is added to the transmission power 9 (total of the transmission powers of the burst signals 4 and 3). In this case, the total of the transmission powers is 9.5, and is lower than the threshold. Accordingly, in addition to the burst signals 4 and 3, transmission of the burst signal 1 is newly permitted.

Thus, permission of transmission of the burst signal is determined in consideration of transmission of the burst signal to, not only the receiving device which is a destination of this burst signal, but also another receiving device, that is, a state of another radio channel (represented as transmission power or transmission rate). The total of transmission powers may be a total of instantaneous transmission power values, or may be an average value of a total within a fixed time interval.

Figure 10:
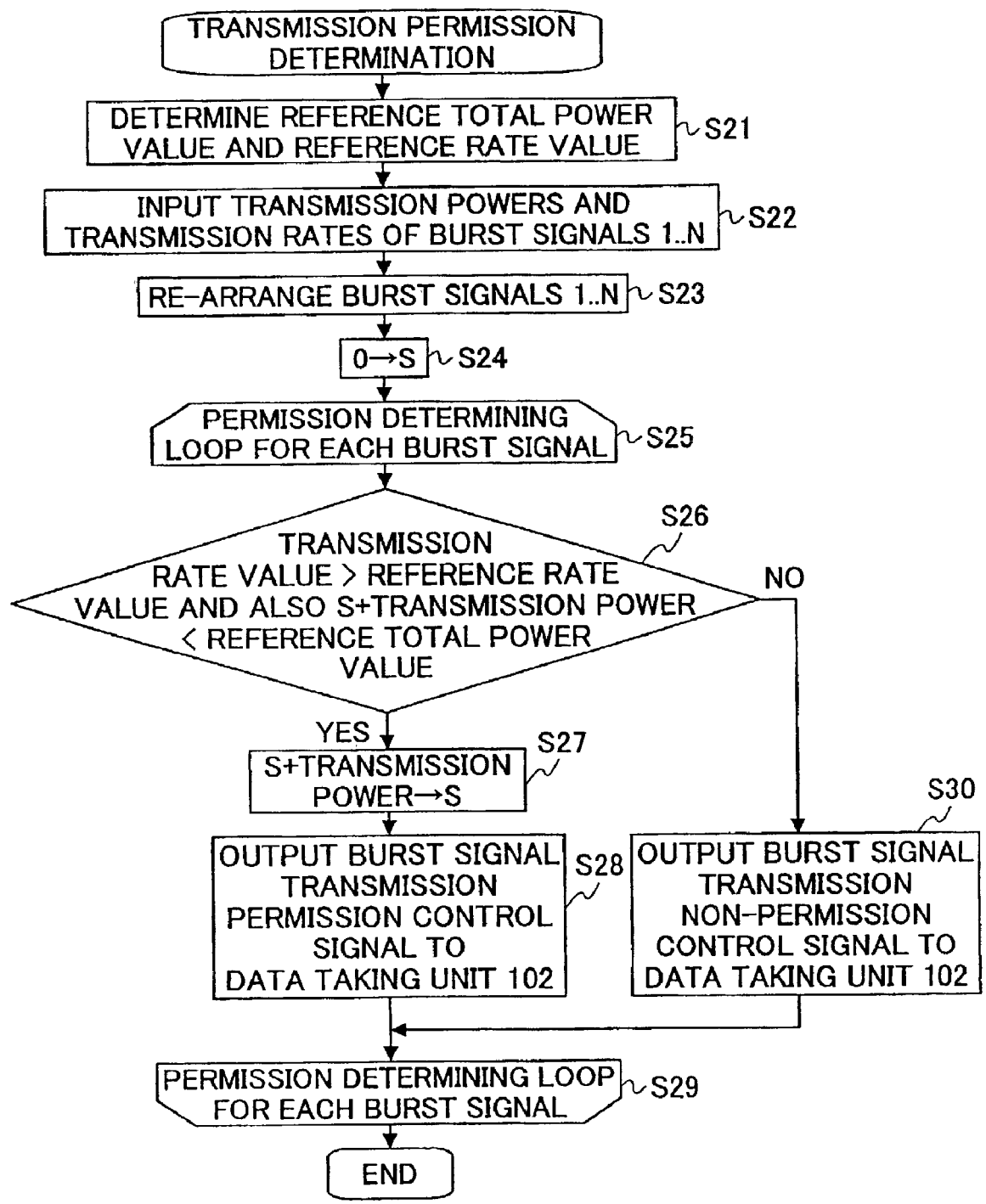
FIG. 10 is a flow chart showing operation of a transmission permission determining unit shown in FIG. 9.

FIG. 10 is a diagram showing one example of algorithm of unitarily determining permission of transmission of a plurality of burst signals in the transmission permission determining unit 107a shown in FIG. 9. The transmission permission determining unit 107a determines a reference total transmission power value in accordance with the states of respective radio channels (radio channels connecting between the transmitting device 100 and receiving devices $200_1$ through $200_M$, respectively) measured by the channel state measuring unit 104 and the media information, and, also, determines a reference transmission rate value based on the states of the respective radio channels (step S21). The reference transmission rate value is determined for each radio channel (each burst signal). Further, the reference total power value is determined based on information representing the states of the respective radio channels from the channel state measuring unit 104 and the state of the burst signals which is the waiting state of being stored in the waiting row unit 110, and, also, the media information provided by a mother apparatus which is a supply source of the burst signals to be transmitted, and is used as a criterion of permission/non-permission of transmission of the burst signal. The media information is performance required for transmission of information such as required data transmission rate, average transmission power value, transmission priority level, required error rate, required maximum delay amount, required average delay amount and/or the like, for example.

Then, the transmission permission determining unit 107*a* inputs transmission power values (maximum transmission power values) and transmission rates (lowest transmission rates) for respective N burst signals determined by the transmission power and transmission rate determining unit 105*a* according to the states of the respective radio channels and the media information (step 522). Then, the transmission permission determining unit 107*a* re-arranges the N burst signals according to the predetermined order (step S23). Then, the transmission permission determining unit 107*a* sets an initial value 0 into a parameter S indicating a total of transmission powers (step S24). Then, the transmission permission determining unit 107*a* selects the top burst signal of the thus-re-arranged burst signals, and starts execution of a permission/non-permission determining loop consisting of steps S26 through S28 (step S25).

The transmission permission determining unit 107*a* determines whether or not the transmission rate value of the thus-selected burst signal is larger than the reference transmission rate value, and also, the transmission power value obtained from adding the transmission power of the thus-selected burst signal to the parameter S (set to 0 initially) is lower than the reference total power value (step S26). When the determination result thereof is YES, the transmission power value of the selected burst signal is added to the parameter S, and thus, the value of the parameter S is updated (step S27). Then, the transmission permission determining unit 107*a* outputs a control signal of permitting transmission of the burst signal to the data taking unit 102 (step S28), and finishes the execution of the permission/non-permission determining loop for the selected burst signal (step S29). In contrast thereto, when the determination result of the step S26 is NO, the transmission permission determining unit 107*a* outputs a control signal of not permitting transmission of the burst signal to the data taking unit 102 (step S30). Then, the next burst signal is selected, and the permission/non-permission determining loop is executed therefor.

When the determination result of the step S26 is NO, the permission/non-permission determination loop is finished (step S29).

Thus, transmission of all the burst signals determined as YES in the step S26 are permitted, and, thus, the sum of the transmission powers thereof does not exceed the reference total power value. Accordingly, it is possible to reduce the interference power for other cells in the cellular mobile communication.

Figure 11:
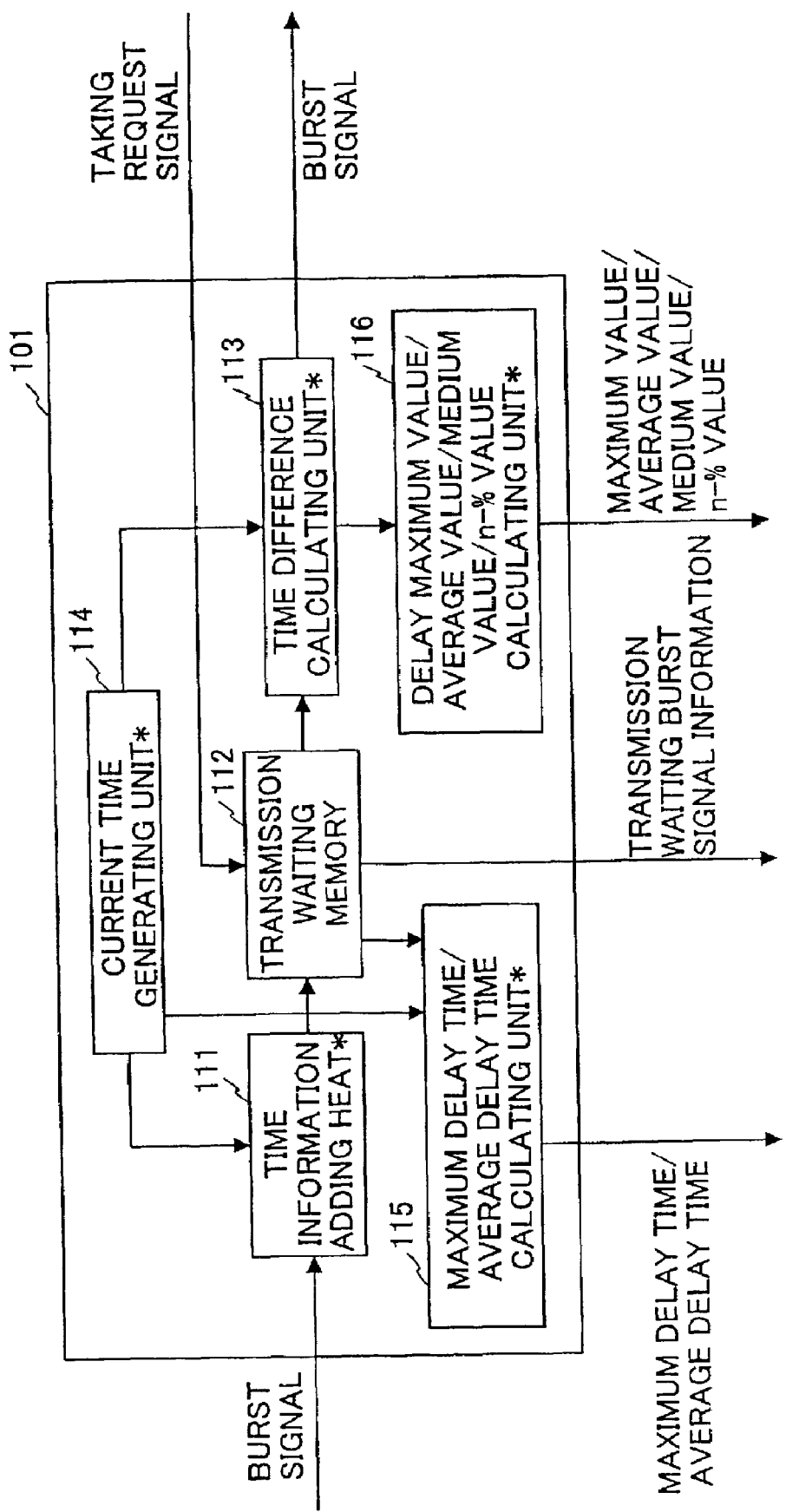
FIG. 11 shows one configuration example of a waiting row unit used in the embodiments of the present invention.

With reference to FIG. 11, the waiting row unit 101 used in the first through third embodiments of the present invention will now be described.

The waiting row unit 101 shown in FIG. 11 includes a time information adding unit 111, a transmission waiting memory 112, a time difference calculating unit 113, a current time generating unit 114, a maximum delay time/average delay time calculating unit 115, and a delay maximum value/average value/n-% value calculating unit 116. The input burst signal has current time information added thereto for each transmission unit (for example, packet length) by the time information adding unit 111, and, then, is stored in the transmission waiting memory 112. When a taking request signal comes from the data taking unit 102, one transmission unit (which may be one arriving at the earliest time, or may be the most important one in a case where difference in importance of information exists within the single burst signal) of the burst signal stored in the transmission memory 112 is selected, and is sent to the transmission difference calculating unit 113. The transmission difference calculating unit 113 sends the input transmission unit to the data taking unit 102, and, also, calculates a time difference value between the time information added thereto and the current time. As the difference value, delay maximum value/average/value/n-% value are calculated by the delay maximum value/average value/n-% value calculating unit 116, and the information is sent to the transmission permission determining unit 107*a*.

The transmission waiting memory 112 calculates the amount of burst signals stored by itself, and sends it to the transmission permission determining unit 107*a* as transmission waiting burst signal amount information. Further, the transmission waiting memory 112 sends part or all of the time information added to the transmission units of the burst signals stored therein to the maximum delay time/average delay time calculating unit 115. The maximum delay time/average delay time calculating unit 115 calculates the maximum value/average delay time thereof, and sends them to the transmission permission determining unit 107*a*.

When the waiting row unit 101 is configured by the minimum parts/components, it is possible to omit the parts/components having (*) in FIG. 11.

Figure 12:
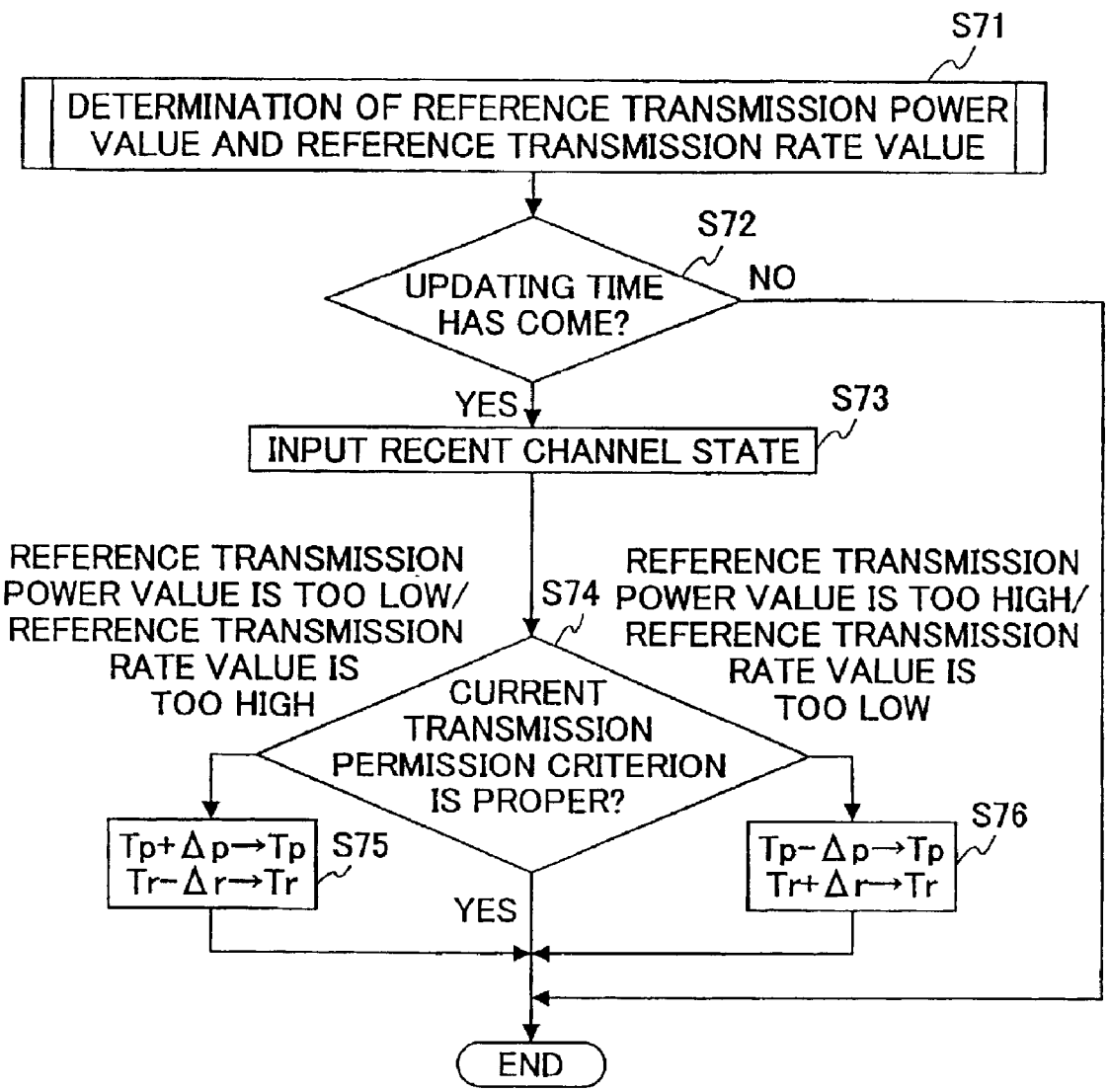
FIG. 12 is a flow chart showing an algorithm of determining a transmission permission criterion also reflecting an immediately preceding reference transmission value in the embodiments of the present invention.

In the above-mentioned first through third embodiments of the present invention, it may be determined whether or not a transmission permission criterion determined as described above is proper through comparison between a required communication quality and an actual communication quality, and it may be updated periodically. Procedure of this determination is shown in a flow chart of FIG. 12. The flow chart shown in the figure is one executed by the above-described transmission permission determining unit 107, 107*a*, and, regardless of whether or not data is transmitted, the transmission permission criterion is updated in a fixed period. In the following description, description is made as of processing by the transmission permission determining unit 107*a* in the third embodiment, by a reason.

First, the transmission permission determining unit 107*a* determines the reference transmission power value and reference transmission rate value as described above (step S71), and determines whether or not an updating time has come (step S72). When the determination result of the step S72 is NO, the transmission permission determining unit 107*a* finishes the processing. In contrast thereto, when the determination result of the step S72 is YES, the latest channel state is input (step S73). Specifically, it may be one obtained from measuring, for a fixed time interval, one (for example, average delay time, average transmission rate, or the like) of the channel state concerning the quality of transmission of the burst signal by the channel state measuring unit 104. Then, the transmission permission determining unit 107*a* determines whether or not the reference transmission power value and reference transmission rate value are proper (step S74). In the step S74, the result obtained from the measurement in the step S73 is compared with a required channel state, and, in accordance therewith, the transmission permission criterion is altered by a predetermined span (steps S75 and S76). Thereby, the transmission permission reference is adaptively altered, and, thus, a required quality can be obtained. For example, in a case of the burst signal for which the average delay time is 'a' required by the media information, the average delay time is measured for a fixed time interval, and, it is determined whether or not the result thereof falls within a value range which is a predetermined range (a1, a2) (a1 and a2 are predetermined constants, and, a1<a<a2). When the average delay time falls within this range, the reference transmission value is not altered. When the average delay time is equal to or shorter than a−s, it can be seen that occasions of permission of transmission are given more than necessary times, and, thus, in order to make this criterion harder, the reference transmission power value is lowered or the reference transmission rate value is increased, or both are performed. When the average delay time is equal to or longer than a+s, the reference transmission power value is increased or the reference transmission rate value is lowered, or both are performed. The altering span of the reference transmission value may be fixed, or may be changed in accordance with the deviation degree from the predetermined range.

Here, it is assumed that Tp denotes the reference transmission power value, Tr denotes the reference transmission rate value, Δp denotes an updating span of the reference transmission power value, and Δr denotes an updating span of the reference transmission rate value. In a step S74, when it is determined that the reference transmission power value is too low and/or the reference transmission rate value is too high, Tp+Δp is set as Tp, and Tr−Δr is set as Tr. In contrast thereto, when it is determined that the reference transmission power value is too high and/or the reference transmission rate value is too low, Tp−Δp is set as Tp, and Tr+Δr is set as Tr. When it is determined as proper in the step S74, no alteration of the reference transmission value is performed.

In the above-mentioned first through third embodiments of the present invention, determination of permission of transmission is made by the transmission end based on the channel state measured by the transmission end. However, determination of permission of transmission is not limited to that made based on the channel state measured by the transmission end, but one observed by the reception end can be transmitted to the transmission end as a control signal. When observation is made by the reception end, the measurement value may be transmitted to the transmission end as it is in a form of real number or the like as a control signal, or, this may be used for determination by the reception end by using a criterion provided there, and a reception-end transmission permission/non-permission determination expressed by a numerical value in two or more finite levels may be obtained therefrom, and may be transmitted to the transmission end.

With reference FIG. 13, an example of a configuration of a receiving device in a case where the reception end transmission permission/non-permission determination is transmitted to the transmission end will now be described.

Figure 13:
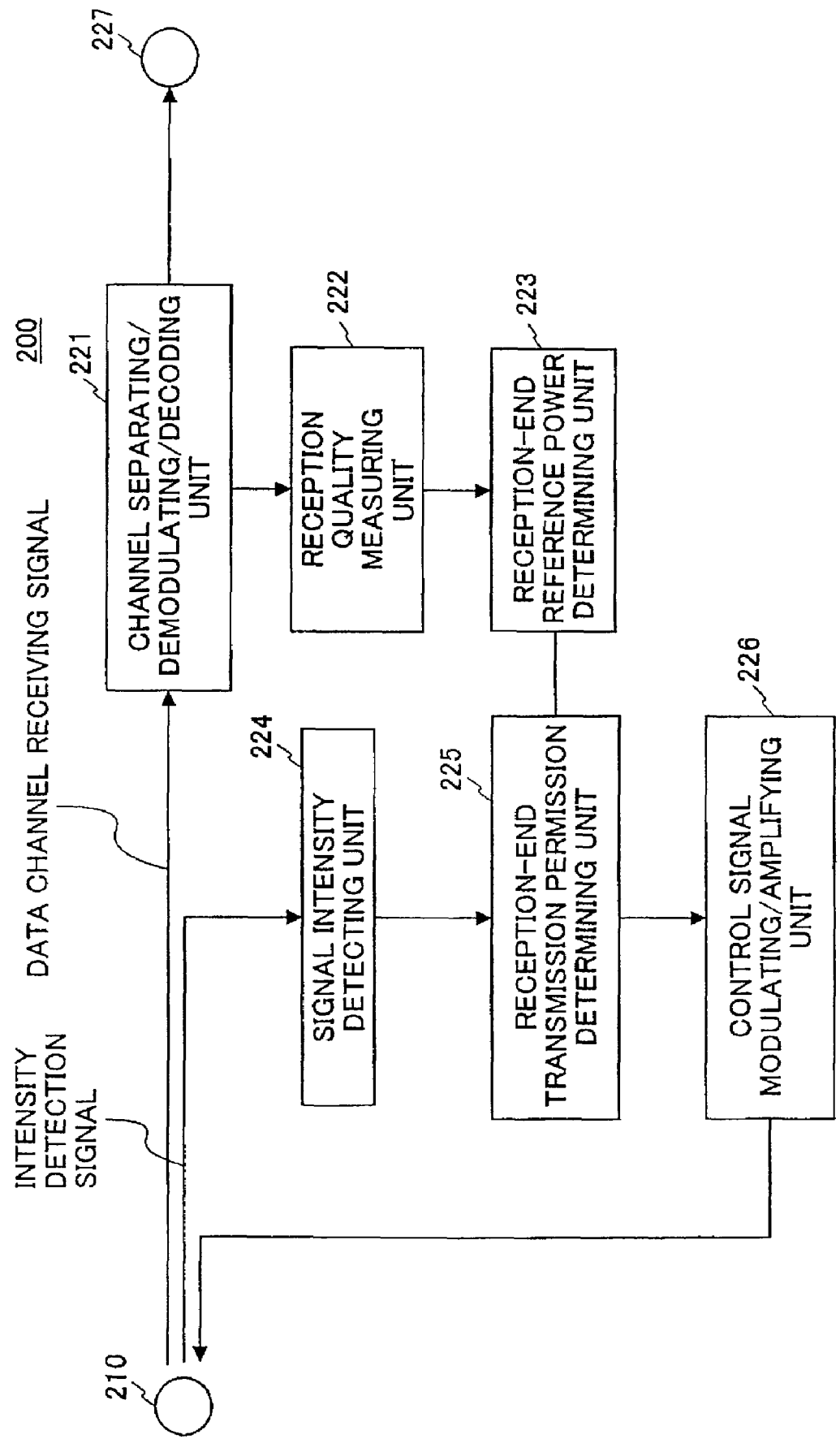
FIG. 13 is a block diagram showing one configuration example of a receiving device which transmits a reception-end transmission permission/non-permission determination to a transmitting device in the embodiments of the present invention.

FIG. 13 is a block diagram showing one example of configuration of the above-described receiving device 200 in the transmitting/receiving system in the mobile communication system in the first through third embodiments of the present invention. In the figure, the receiving device 200 includes a channel separating/demodulating/decoding unit 221, a reception quality measuring unit 222, a reception-end reference power value determining unit 223, a signal intensity detecting unit 224, a control signal modulating/amplifying unit 225 and a burst signal output terminal 226.

In order that the receiving device 200 measures the channel state, the transmitting device 100 sends out an intensity detecting signal by a transmission power value already known in the receiving device 200. As this intensity detecting signal, any signal can be used which can be detected by the signal intensity detecting unit 224 of the receiving device 200, and, also, for which the transmission power value is already known. For example, it may be a single one using a common channel which is common for a plurality of receiving devices from one transmitting device, or, it may be one using particular channels to the respective receiving devices. By using the common channel, a single intensity detecting signal can be used by all the receiving devices, and, thus, the power utilization efficiency can be improved. Further, it may be transmitted always regardless of whether or not the burst signal to be transmitted exists, or may be transmitted only when the burst signal to be transmitted exists. By transmitting it only when the burst signal to be transmitted exists, it is possible to avoid useless processing by the receiving device and sending out of the control signals when no burst signal to be transmitted exists. Further, the intensity detection signal may be transmitted continuously, or may be transmitted discontinuously (periodically or non-periodically). By transmitting the intensity detecting signal continuously, the reception end can estimate the channel state at any time. Further, the intensity detecting signal may be a special signal for intensity detection (pilot signal), or may also be used as the control signal and/or burst signal.

In the configuration shown in FIG. 13, the reception quality measuring unit 222 measures the channel state seen from processing process and processing result of the data channel reception signal in the channel separating/demodulating/decoding unit 221. The reception-end reference power determining unit 223 determines a reception-end reference power based on the measurement result and a past reference power. For example, an n % value (a value, lower than which n % of all of the received burst signals fall) of delay times of the received burst signals are periodically measured, and, when the measurement result is larger than a predetermined target delay time, the reception-end reference power may be lowered by a fixed value from the preceding one. Otherwise, the reception end reference power may be raised by a fixed value from the preceding one Further, the signal intensity detecting unit 224 of the receiving device 200 estimates the channel state, and the reception-end transmission permission determining unit 225 compares it with the reception-end reference power. The comparison result may be a difference therebetween, or may be one obtained from converting it into a corresponding numerical value in finite levels by a range to which it belongs. The control signal modulating/amplifying unit 226 transmits the comparison result to the transmitting device through an antenna 210. The comparison result may be transmitted each time the reception-end transmission permission determination is generated by the reception-end transmission permission determining unit 225, or only when it changes from the precedingly sent comparison result. For example, when the reception-end transmission permission determination is transmitted as binary information, by transmitting this determination periodically, it is possible to send the control signal having a high anti-transmission-error property. Alternatively, by sending the information only when the determination is inverted, it is possible to reduce the amount of control signal.

By utilizing this as a part of the criterion of transmission permission determination by the transmission permission determining unit 107, 107a of the transmitting device 100, it is possible to perform the transmission permission determination also in consideration of the criterion of the channel state determined by the receiving device. Alternatively, by using the reception-end transmission permission determination expressed by binary numerical value, as it is, as the transmission permission determination in the transmission permission determining unit of the transmitting device, it is possible to make a manner equivalently as if transmission permission is determined in the reception end device.

Figure 14:
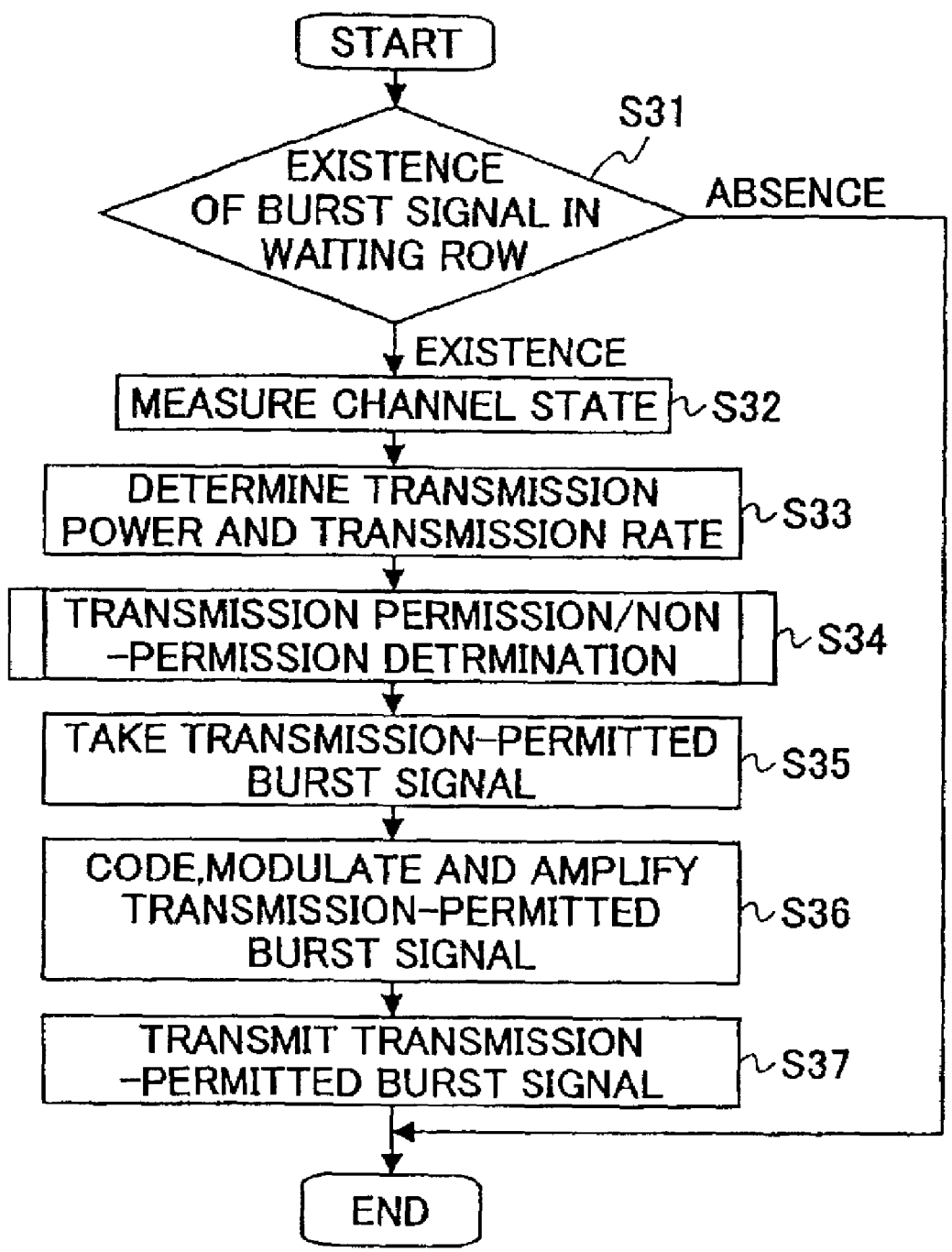
FIG. 14 is a flow chart showing operation of the transmitting device used in the embodiments of the present invention.

FIG. 14 is a flow chart showing operation of the transmitting device 100 used in the above-described second and third embodiments of the present invention. First, the transmission permission determining unit 107a determines whether or not any burst signal exists in the waiting row unit 101 (step S31). When the determination result thereof is YES, the transmission power and transmission rate determining unit 105a takes data concerning the channel state and the media information from the channel state measuring unit 104 (step S32), and determines the transmission power and transmission rate in the manner described in the step S12 of FIG. 8 or the step S22 of FIG. 10. Then, the transmission permission determining unit 107a determines permission/non-permission of transmission in accordance with the algorithm shown in FIG. 8 or FIG. 10 (step S34). The transmission permission determining unit 107a controls the data taking unit 102, takes the burst signal for which transmission is permitted from the waiting row unit 101, and gives it to the coding/modulating/amplifying unit 103 (step S35). The coding/modulating/amplifying unit 103 performs coding, modulating and amplifying of the burst signal for which transmission is permitted (step S36), and transmits the burst signal through the antenna 110 (step S37).

The flow chart shown in FIG. 14 also shows transmission operation of the transmitting device 100 used in the first embodiment of the present invention. However, in the first embodiment, only the transmission power is used, and the transmission rate is not used.

The above-mentioned first through third embodiments of the present invention may be applied to control of information distribution. One example of mobile communication system to which a method of information distribution to a mobile set and an information distribution control device are applied will now be described as a fourth embodiment of the present invention.

Figure 15:
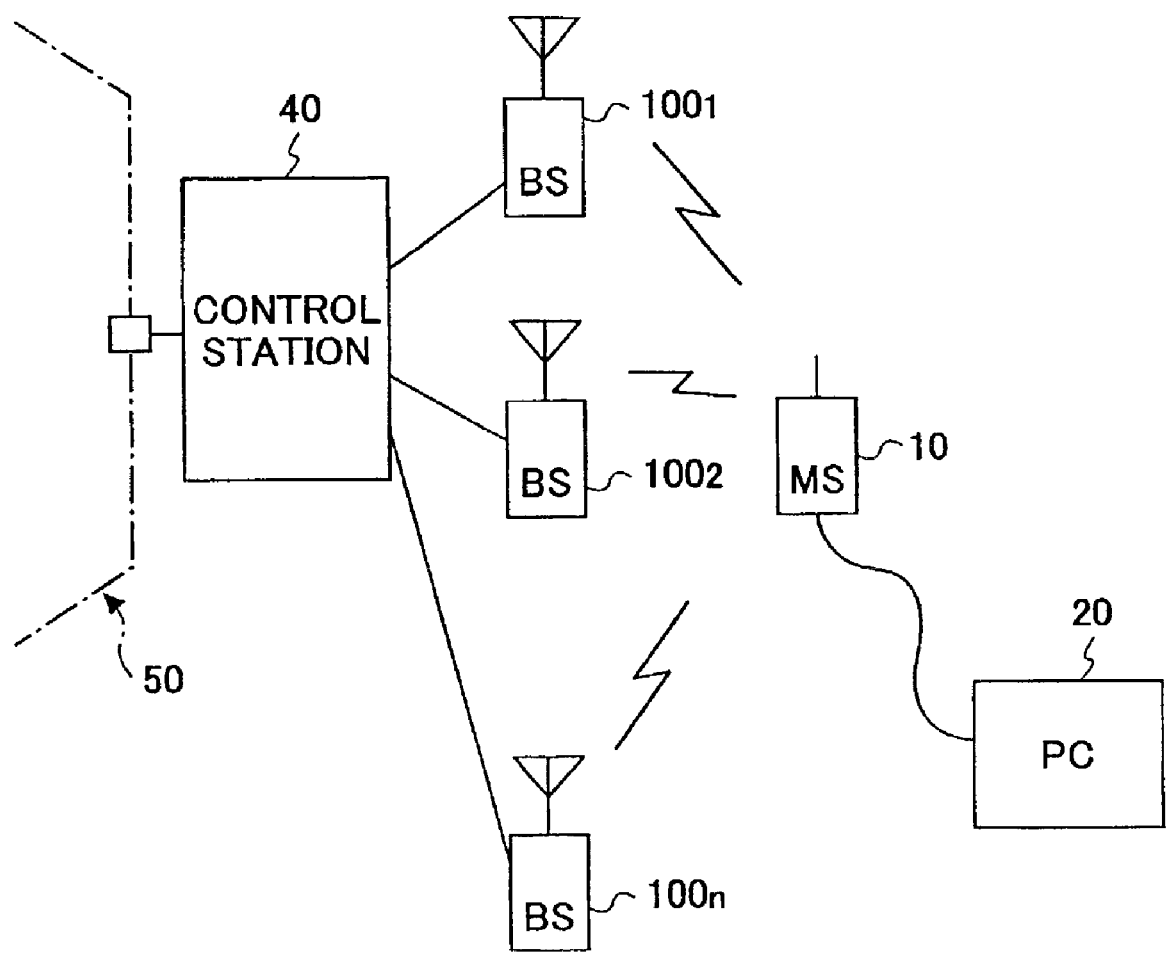
FIG. 15 is a block diagram showing a basic configuration example of a mobile communication system to which an information distributing method and an information distribution control device in a fourth embodiment of the present invention are applied.

FIG. 15 is a block diagram showing the fourth embodiment of the present invention. In FIG. 15, to a mobile set (MS) 10 such as a portable telephone, a PHS terminal or the like, an information processing apparatus (PC) 20 such as a computer is connected . Further, the mobile set 10 can perform radio communication with base stations $100_1$, $100_2$, . . . , $100_n$ set in a service area of the mobile communication. The respective base stations $100_1$, $100_2$, . . . , $100_n$ are connected to a control station 40. The control station 40 controls the respective base stations (BS) $100_1$, $100_2$, . . . $100_n$, and, also, performs repeating of communication between respective base stations performing communication with the mobile set 10 and a network 50.

In particular, in downlink communication, the control station 40 transmits data addressed to the mobile set 10 from the network 50 by distributing it to base stations determined in accordance with a method described later. Further, this control station 40 monitors the base stations $100_1$, $100_2$, . . . , $100_n$, collects data which is determined not to be transmitted from the respective base stations for a while, and distributes it to other base stations again.

Figure 16:
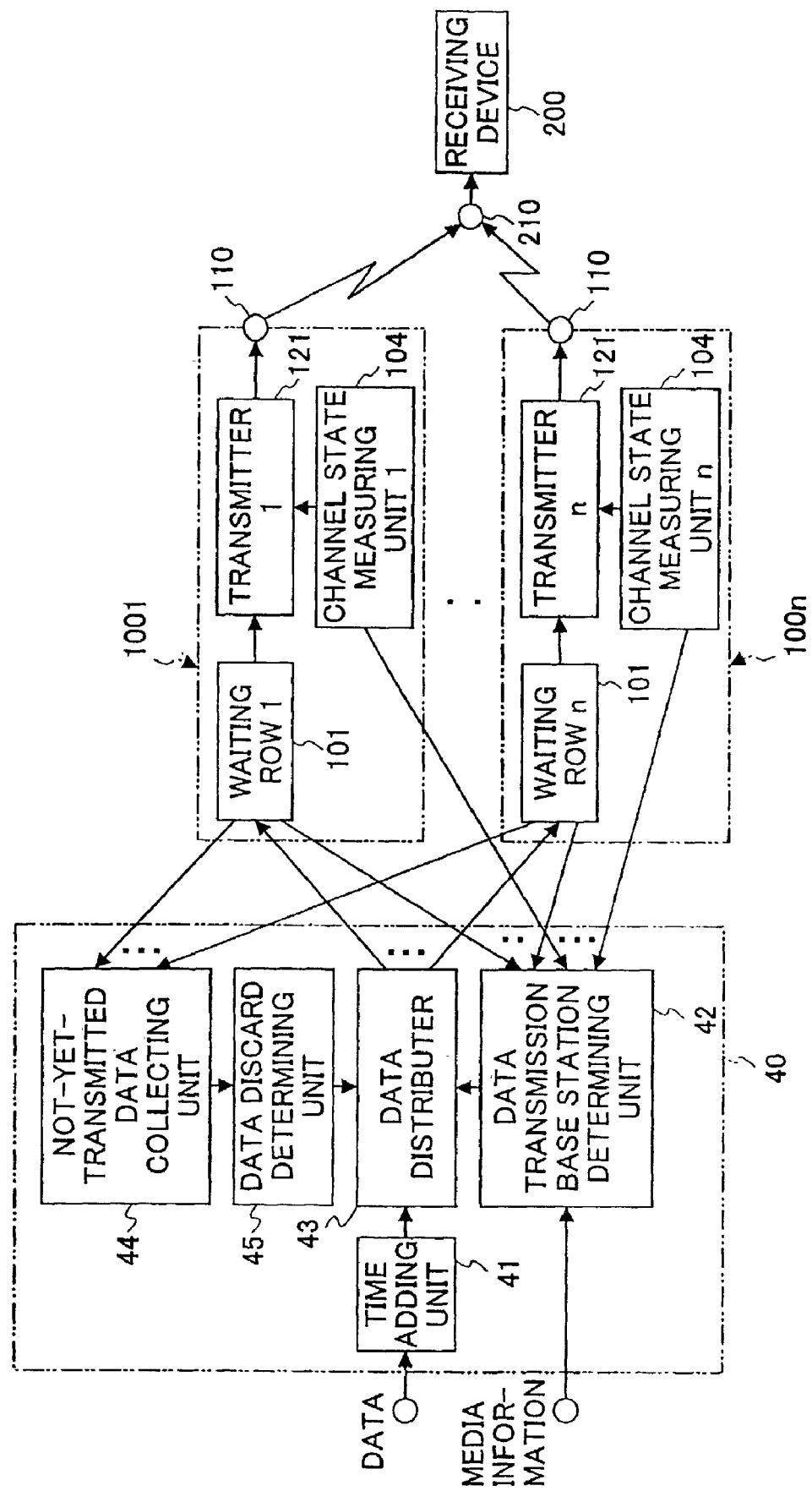
FIG. 16 is a block diagram showing configurations of a control station, base stations and a mobile set concerning downlink communication in the mobile communication system shown in FIG. 15.

In the above-mentioned mobile station, the control station 40 and respective base stations $100_1$, $100_2$, . . . , $100_n$ are configured as shown in FIG. 16, for example.

Figure 18:
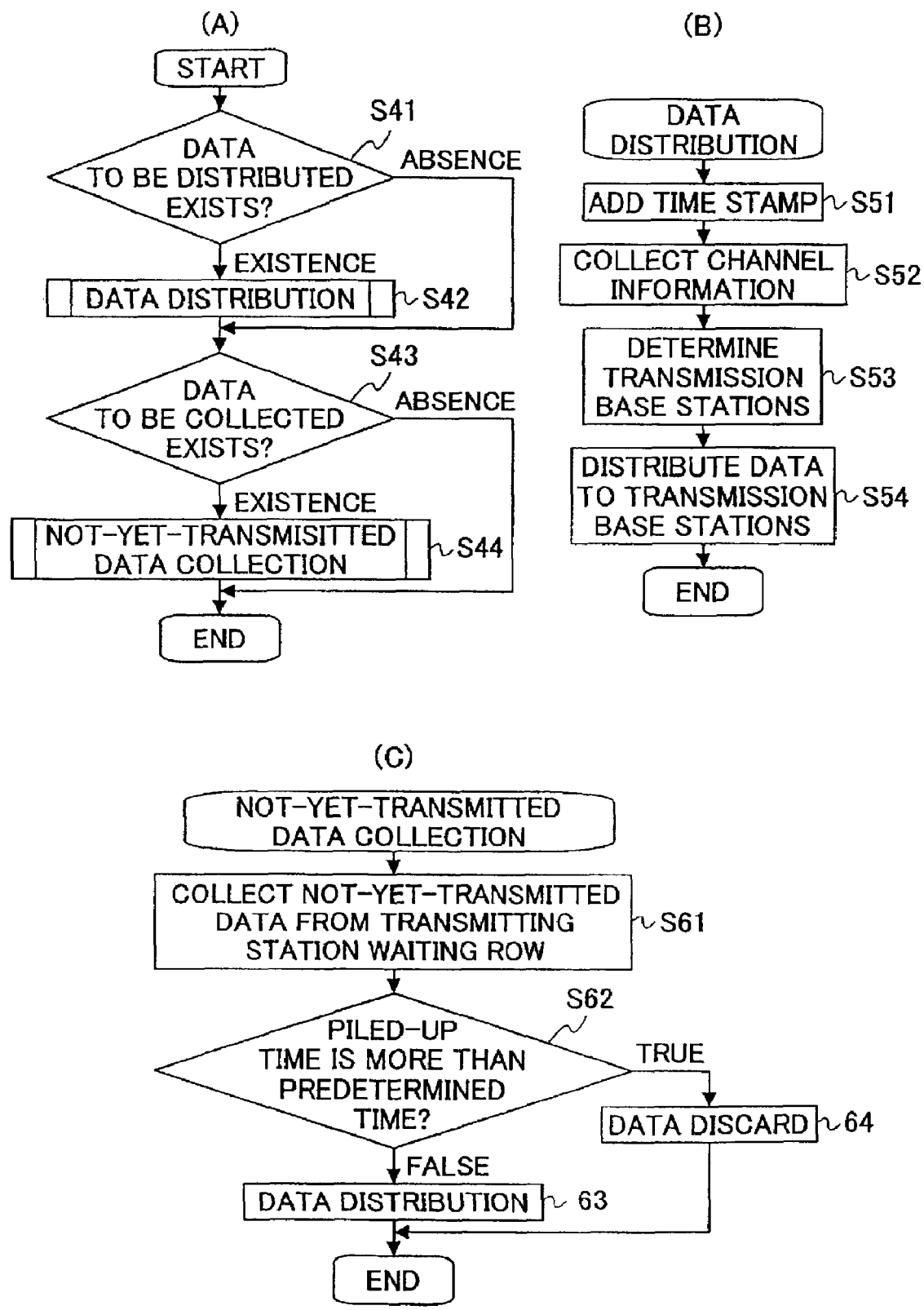
FIG. 18 is flow charts showing operations of the control station shown in FIGS. 15 and 16.

The configuration of operation of the control station 40 will now be described with reference to FIG. 16 and a flow chart of FIG. 18.

The control station 40 has a time adding unit 41, a data transmitting base station determining unit 42, a data distributing unit 43, a not-yet-transmitted data collecting unit 44, and a data discard determining unit 45. A basic control sequence of the control station 40 is as shown in FIG. 18(A). The control station 40 determines whether or not data to be distributed exists (step S41). When determining that it exists, the control station 40 distributes the data as shown in FIG. 18(B) (step S42), and, then, performs a step S43. In the step S41, when determining that it does not exist, the control station 40 directly proceeds to the step S43. In the step S43, when determining that data to be collected exists, the control station 40 collects the not-yet-transmitted data as shown in FIG. 18(C) (step S44), and finishes the processing. In the step S43, when determining that no data to be collected exists, the control station 40 finishes the processing.

Each component of the control station 40 will now be described in detail.

The time adding unit 41 adds a reception time (time stamp) to data (packet) addressed to the mobile set 10 provided from the network 50 (step S51). The data transmission base station determining unit 42 determines base stations to which the data is transmitted for the mobile set 10, according to a method (step S52) described later. The data distributor 43 distributes the data, to which the reception time is added as mentioned above, to the base stations determined by the data transmission base station determining unit 42 (step S54).

In this system, as data can be transmitted to the mobile set 10 from the plurality of base stations, the amount of data per unit time period provided to the control station 40 through the network 50 may exceed the data amount per unit time period which can be transmitted by each base station. Further, the unit data length (unit number of packets) distributed as mentioned above may be the same as the unit data length of data provided from the network 50, or may be different therefrom.

The not-yet-transmitted data collecting unit 44 collects packets which are stored in the waiting row unit 120 of each base station without being transmitted for a fixed time interval, as packets which are not likely to be transmitted (step S61). Further, it may collect packets when another base station has vacancy (waiting row becomes vacant), or may collect packets in consideration of both the above-mentioned time interval and the vacancy states of other base stations. For the packets collected by this not-yet-transmitted data collecting unit 4, determination is made as to whether or not they are to be discarded (step S62). This determination is performed based on a piled-up time calculated based on the reception time added to each packet and the current time. That is, when the piled-up time is equal to or longer than a predetermined time, the relevant packet is discarded (step S64). The packets not discarded are returned to the data distributor 43, and, are distributed to respective base stations determined by the data transmission base station determining unit 42 at this time (step S63).

Figure 17:
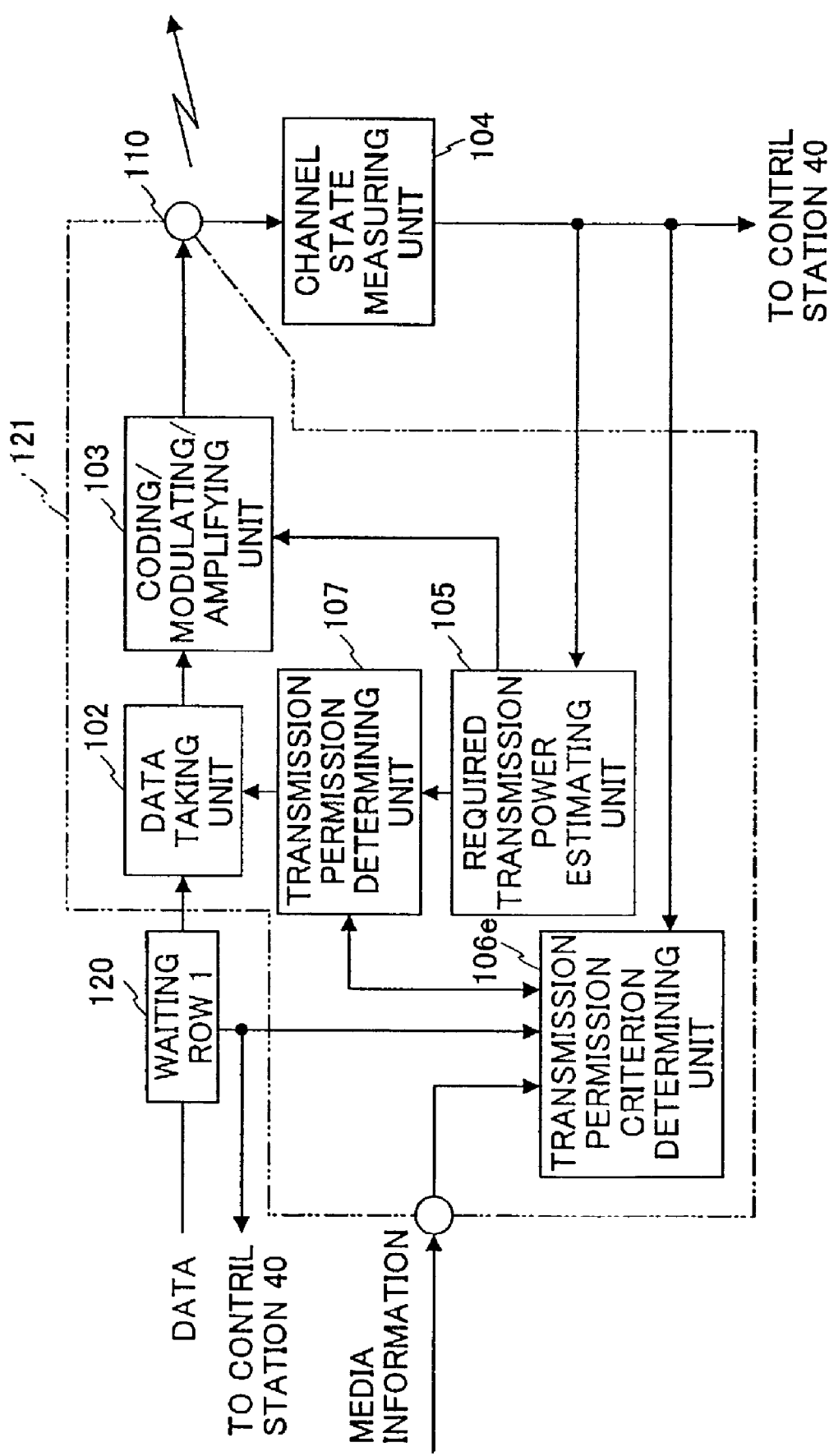
FIG. 17 shows a configuration example of each base station shown in FIGS. 15 and 16.

Each transmitting station $100_1$, $100_2$, . . . , $100_n$ is configured by the transmitting device 100 of the above-described first through third embodiments. In FIG. 16, for the sake of convenience, only the waiting row unit 101 and channel state measuring unit 150 of the above-described components are shown, and the other components are indicated as a transmitter 121. That is, when each transmitting stab $100_1$, $100_2$, . . . , $100_n$ has the configuration shown in FIG. 6, the transmitter 121 of each base station includes, as shown in FIG. 17, the data taking unit 102, coding/modulating/amplifying unit 103, required transmission power estimating unit 105, transmission permission criterion determining unit 106e and transmission permission determining unit 107 described with reference FIG. 6. Further, when each transmitting stab $100_1$, $100_2$, ..., $100_n$ has the configuration shown in FIG. 7, the transmitter 121 of each base station includes the data taking unit 102, coding/modulating/amplifying unit 103, required transmission power and transmission rate determining unit 105a and transmission permission determining unit 107a shown in FIG. 7.

The waiting row unit 101 stores therein data transmitted from the control station 40 for packet units sequentially. The transmitting device 100 takes the data stored in the waiting row unit 101 in transmission timing, and transmits the data to the mobile set 10 through the antenna 110 wirelessly.

The above-mentioned channel state measuring unit 104 measures the state of the radio channel between the transmitter 121 and the receiving device 200 of the mobile set 10. As information representing the state of the radio channel, as described above, for example, any of or a combination of some of instantaneous path loss value between the transmitting and receiving units, data transmission error rate, transmission throughput, distance between the transmitting and receiving units, relative positional relationship between the transmitting and receiving units, interference power value which the receiving device 200 receives from transmitting wave from another transmitting station, the number of other mobile sets to which data is to be transmitted through the antenna 110, required time, data amount, short-span average value, long-span average value thereof, may be used.

The channel information representing the state of the radio channel measured by the channel state measuring unit 104 is provided to the transmitter 121, and, also, is transmitted to the above-mentioned data transmission base station determining unit 42 of the control station 40. The transmitter 121, when having the above-described configuration according to the first embodiment, determines the transmission power and transmission timing based on this channel information, and, transmits data taken from the waiting row unit 101 in this transmission timing by the determined transmission power.

The data to be transmitted wirelessly from each base station as mentioned above is received by the receiving device 200 in the mobile set 10 through the antenna 210. The thus-received data is further transmitted to the information processing apparatus 20, which then processes the data.

The above-mentioned control station 40 distributes data addressed to the mobile set 10 provided from the network 50 to respective base stations, by the following manner:

The data transmission station determining unit 42 determines base stations which are to transmit the data provided addressed to the mobile set 10, to the mobile set 10, based on the media information provided from the network together with the data, the above-mentioned channel information provided from the respective base stations $100_1$, $100_2$, ..., $100_n$, and, also, information indicating the data transmission waiting states (waiting row information) in the respective waiting row units 101 provided by the respective base stations $100_1$, $100_2$, ..., $100_n$.

The above-mentioned channel information indicates a degree by which the state of the radio channel between each base station and mobile set 10 is suitable for radio communication (small path loss, small error rate, small interference, small attenuation, and/or the like). Based on the channel information, the data transmission determining unit 42 can select base stations having the states of the radio channels with the mobile set 10 which are those more suitable for radio communication.

Further, as the waiting row information, for example, any of or a combination of some of the number of packets of data stored in the waiting row unit 101, the maximum delay time thereof and the average delay time thereof is used. Based on the waiting row information, it is possible to determine a generous transmission waiting time of the distributed data.

The media information provided to the data transmission base station determining unit 42 as mentioned above is information indicating performance required for transmission of the data provided, and, for example, is configured by any of or a combination of some of the required data transfer rate, transfer priority level, required error rate, required maximum delay amount, required average delay amount, and transmission permission base station information (for each communication, a group of base stations (for example, three stations) which are permitted to perform transmission).

The above-mentioned data transmission base station determining unit 42 determines one or a plurality of base stations which can perform data transmission to the mobile set 10 in a condition in which the performance indicated by the media information is satisfied as possible, in consideration of combination of the above-mentioned channel information, waiting row information and media information. An algorithm of determining these base stations may be determined freely. For example, for each base station, the channel information, waiting row information and media information are expressed by a numerical value, and, thus, a degree of suitability as a transmission base station is calculated. Then, a predetermined number of the most superior base stations (3 base stations) are determined as base stations which perform communication with the mobile set.

As a result of the base stations being thus determined based on the degree of suitability, a base station which has a shorter waiting time in the waiting row unit 101 is given priority to be selected when data which should be transmitted to the mobile set 10 urgently (when the required data transfer rate is large) is provided, for example. Further, when data which should be transmitted to the mobile set with great importance to quality provided (when the required error rate is small), a base station having a satisfactory state of the radio channel with the mobile set 10 is given priority to be selected as the transmission base station.

After the plurality of base stations to transmit the data to the mobile set 10 are determined by the data transmission base station determining unit 42 as mentioned above, the data distributor 43 distributes and transmits the provided data to the determined plurality of base stations.

The algorithm of determining the base stations to which the data is to be distributed can be determined freely.

For example, when priority is given to positive transmission of data to the mobile set 10, part or all of the data to be transmitted can be copied, and thus, the part or all of the data can be distributed to the plurality of base stations with duplication. Further, when priority is given to soonest possible transmission of data to the mobile set 10, the data to be transmitted is divided, and the divided data can be distributed to the respective base stations without duplication.

Distribution amounts to the respective base stations in the distribution of data performed by the data distributor 43 may be equal distribution, or may be distribution with a fixed rate in the order of the degree of suitability calculated for each base station determined as mentioned above. Further, the distribution amounts of data to the respective base stations may be determined based on any of or a combination of some of the waiting row information and channel information provided from the above-mentioned respective base stations. For example, it is possible to determine the distribution amounts of data in a manner such that a larger amount of data may be stored in the waiting row unit 101 of a base station having a better state of the radio channel with the mobile set 10.

Each base station having received the data distributed as mentioned above transmits the data to the mobile set 10 to which the data is addressed. In a process of transmission (distribution) of the data to the mobile set 10 from each base station, the not-yet-transmitted data collecting unit 44 inspects waiting data (packets) in the waiting row unit 101 of each base station, and collects data which has been piled up for a predetermined time or longer. Further, when vacancy occurs in another base station, the not-yet-transmitted data collecting unit 44 may collect data therefrom, or may collect data in consideration of both the above-mentioned time and the vacancy state of another base station. Then, the collected packets undergo determination as to whether or not they are discarded by the data discard determining unit 45. The packets not determined to be discarded are distributed again by the data distributor 43 to one or a plurality of base stations determined by the data transmission base station determining unit 42 at the time.

On the other hand, the packets which have the piled up times, each obtained from the reception time and current time, equal to or longer than the predetermined time are discarded in viewpoint that transmission of other data without delay should be given priority.

As described above, according to the fourth embodiment of the present invention, base stations which perform communication with the mobile set are determined, and, also, distribution amounts of data to the thus-determined base stations are determined, based on any of or a combination of some of the waiting row information, channel information and media information. Further, each base station, based on any of or a combination of some of the above-mentioned waiting row, channel information and media information, the transmission timing is controlled. Thereby, when information is distributed to the mobile set, the mobile set can receive the distributed information in a more satisfactory state.

As described above, according to the present invention, transmission time (whether or not the burst signal is to be transmitted) of the burst signal is determined in consideration of the state of the radio channel. Thereby, when the burst signal is transmitted, the time of transmission can be determined in a manner such that either one or both the transmission power and transmission rate determined in accordance with the state of the radio channel are not inappropriate for the mobile communication system as possible.

Further, according to the present invention, information to be distributed to the mobile set is distributed to a plurality of base stations, and, from each of the plurality of base stations, the distributed information is transmitted to the mobile set. Thereby, it is possible to adaptively alter a mode of distributing the information through a manner of distribution of the information to be distributed such as the states of the base stations to which the information to be distributed is distributed, the states of the radio channels between the respective base stations to which the information is distributed and the mobile set, distribution amounts of the information and so forth. As a result, even when the base stations which perform communication with the mobile set are determined in a relatively long period, (for example, the period of measuring of the channel is elongated), information distribution in a more appropriate mode can be performed through a manner of distributing the information. Accordingly, it is possible to distribute information to the mobile set in a manner such that reception of the information by the mobile set can be performed in a state as satisfactory as possible while a control amount needed for the information distribution can be reduced as possible.

The invention claimed is:

1. A method of transmitting a burst signal when the burst signal is transmitted from a transmitting station to a receiving station at a transmission power value and/or transmission rate determined in accordance with a state of a radio channel between said transmitting station and receiving station in a mobile communication system, wherein:

it is determined as to whether or not the burst signal is to be transmitted based on a comparison result between a criterion previously determined in accordance with the state of the radio channel and a transmission waiting state of said signal, and the state of the radio channel between the transmitting station and receiving station;

the burst signal is transmitted from the transmitting station to the receiving station when it has been determined that the burst signal is to be transmitted;

determining that a signal transmission permission criterion is made based on a channel state; and making a modification of the signal transmission permission criterion according to a transmission waiting state, in such a manner that the transmission permission criterion is made easier as the transmission waiting time is longer, while the transmission permission criterion is made more difficult as the transmission waiting time is shorter.

2. The method of transmitting a burst signal as claimed in claim 1, wherein:

said criterion is determined based on the state of the radio channel.

3. The method of transmitting a burst signal as claimed in claim 1, wherein:

the determination as to whether or not the burst signal is to be transmitted is performed further depending on performance required for transmitting the burst signal.

4. The method of transmitting a burst signal as claimed in claim 3, wherein:

said criterion is determined depending on the performance required for transmitting the burst signal.

5. The method of transmitting a burst signal as claimed in claim 3, wherein:

at least one of the transmission power value and transmission rate of the burst signal to be transmitted is determined further depending on the performance required for transmitting the burst signal.

6. The method of transmitting a burst signal as claimed in claim 1, wherein:

said criterion is expressed as a reference transmission power value and/or reference transmission rate, and, it is determined as to whether or not the burst signal is to be transmitted based on the comparison result between the reference transmission power value and/or reference transmission rate and transmission power value and/or transmission rate determined in accordance with the state of the radio channel.

7. The method of transmitting a burst signal as claimed in claim 1, wherein the state of the radio channel comprises not only the state of the radio channel between the transmitting station and receiving station to which the burst signal is addressed but also the state of a radio channel with another receiving station.

8. The method of transmitting a burst signal as claimed in claim 7, wherein said criterion is a reference total power value, and bursts which can be transmitted are selected from a plurality of burst signals in a manner such that a total of transmission power values of the plurality of burst signals does not exceed the reference total power value.

9. The method of transmitting a burst signal as claimed in claim 8, wherein burst signals are selected from the plurality of burst signals in a predetermined order, and a total of transmission power values is obtained, and, then, when said total does not exceed the reference total power value, it is determined that the thus-selected burst signals can be transmitted.

10. A transmitting device in a mobile communication system in which a burst signal is transmitted to a receiving station at a transmission power value and/or transmission rate determined in accordance with a state of a radio channel with the receiving station, comprising:
    transmission permission criterion determining means determining a transmission permission criterion of the burst signal;
    determining means determining as to whether or not the burst signal is to be transmitted based on a comparison result between the transmission permission criterion determined by said transmission permission criterion detecting means, a transmission waiting state of the burst signal and the state of the radio channel with the receiving station;
    transmission control means transmitting the burst signal to the receiving station when it has been determined by said determining means that the burst signal is to be transmitted;
    determination means for determining a signal transmission permission criterion is made based on a channel state; and
    modification means for making modification of the signal transmission permission criterion according to a transmission waiting state, in such a manner that the transmission permission criterion is made easier as the transmission waiting time is longer, while the transmission permission criterion is made more difficult as the transmission waiting time is shorter.

11. The transmitting device in a mobile communication system as claimed in claim 10, wherein:
    said transmission permission criterion determining means determines the transmission permission criterion based on the state of the radio channel with the receiving station.

12. The transmitting device in a mobile communication system as claimed in claim 10, wherein:
    said transmission permission criterion determining means determines the transmitting permission criterion further depending on the transmission waiting state of the burst signal.

13. The transmitting device in a mobile communication system as claimed in claim 10, wherein:
    a determination result by said determining means further depends on performance required for transmitting the burst signal.

14. The transmitting device in a mobile communication system as claimed in claim 13, wherein:
    said transmission permission criterion determining means determines the transmission permission criterion further depending on the performance required for transmitting the burst signal.

15. The transmitting device in a mobile communication system as claimed in claim 13, comprising:
    transmission power determining means determines the transmission power value of the burst signal to be transmitted based on the performance required for transmitting the burst signal as well as the state of the radio channel.

16. The transmitting device in a mobile communication system as claimed in claim 15, wherein:
    said transmission permission criterion determining means determines a reference transmission power value as the transmission permission criterion; and
    said determining means determines as to whether or not the burst signal is to be transmitted based on the comparison result between the reference transmission power value determined by said transmission permission criterion determining means and the transmission power value determined in accordance with the state of the radio channel.

17. The transmitting device in a mobile communication system as claimed in claim 13, comprising a transmission rate determining means determining the transmission rate of the burst signal to be transmitted based on the performance required for transmitting the burst signal as well as the state of the radio channel.

18. The transmitting device in a mobile communication system as claimed in claim 10, wherein:
    said transmission permission criterion determining means determines a reference transmission rate; and
    said determining means determines as to whether or not the burst signal is to be transmitted based on the comparison result between the reference transmission rate value determined by said transmission permission criterion determining means and the transmission rate value determined in accordance with the state of the radio channel.

19. The transmitting device in a mobile communication system as claimed in claim 10, wherein:
    said transmission permission criterion determining means determines a reference transmission power value and a reference transmission rate; and said determining means determines as to whether or not the burst signal is to be transmitted based on the comparison result between the reference transmitting power value and reference transmission rate value determined by said transmission permission criterion determining means and the transmission power value and transmission rate value determined in accordance with the state of the radio channel.

20. The transmitting device in a mobile communication system as claimed in claim 10, wherein said detennining means makes the determination in consideration of not only the state of the radio channel between the transmitting station and receiving station to which the burst signal is addressed but also the state of a radio channel with another receiving station.

21. The transmitting system in a mobile communication system as claimed in claim 20, wherein:
    said transmission permission criterion determining means determines a reference total power value as the transmission permission criterion; and
    said determining means selects bursts which can be transmitted from a plurality of burst signals in a maimer such that a total of transmission power values of the plurality of burst signals does not exceed the reference total power value.

22. The transmitting system in a mobile communication system as claimed in claim 21, wherein:
said determining means selects burst signals from the plurality of burst signals in a predetermined order, and a total of transmission power values is obtained, and, then, when said total does not exceed the reference total power value, said determining means determines that the thus-selected burst signals can be transmitted.

23. A method of distributing information to a mobile set in a mobile communication system in which communication is performed between a base station and the mobile set, wherein:
one or a plurality of base stations are determined to perform communication with the mobile set, and based on a transmission waiting state of information to be distributed in each base station;
information to be distributed to the mobile set is distributed to the thus-determined one or plurality of base stations;
each base station transmits the thus-distributed information to the mobile set;
determining that a signal transmission permission criterion is made based on a channel state; and
making a modification of the signal transmission permission criterion according to a transmission waiting state, in such a manner that the transmission permission criterion is made easier as the transmission waiting time is longer, while the transmission permission criterion is made more difficult as the transmission waiting time is shorter.

24. The method of distributing information in a mobile communication system as claimed in claim 23, wherein:
the one or plurality of base stations to perform communication with the mobile set are determined based on a state of a radio channel with the mobile set.

25. The method of distributing information in a mobile communication system as claimed in claim 23, wherein:
the one or plurality of base stations to perform communication with the mobile set are determined based on performance required for transmission of the information to be distributed to the mobile set.

26. The method of distributing information in a mobile communication system as claimed in claim 23, wherein:
the information to be distributed to the mobile set is distributed to the thus-determined one or plurality of base stations without duplication.

27. The method of distributing information in a mobile communication system as claimed in claim 23, wherein:
a part or all of the information to be distributed to the mobile set is copied, and the information to be distributed to the mobile set is distributed to the thus-determined one or plurality of base stations with duplication of the part or all of the information.

28. The method of distributing information in a mobile communication system as claimed in claim 23, wherein:
a larger amount of the information is distributed to a base station of the thus-determined one or plurality of base stations which has a smaller amount of information in a transmission waiting state.

29. The method of distributing information in a mobile communication system as claimed in claim 23, wherein:
a larger amount of the information is distributed to a base station of the thus-determined one or plurality of base stations which has a better state of the radio channel with the mobile set.

30. The method of distributing information in a mobile communication system as claimed in claim 23, wherein:
amounts of distributing of the information to the thus-determined one or plurality of base stations are determined based on an amount of information in a transmission waiting state and a state of the radio channel with the mobile set in each base station.

31. The method of distributing information in a mobile communication system as claimed in claim 30, wherein:
the information is distributed to the thus-determined one or plurality of base stations in a manner such that a base station having a better state of the radio channel with the mobile set may have a larger amount of information in a transmission waiting state.

32. The method of distributing information in a mobile communication system as claimed in claim 23, wherein:
when a state of information piled up in a transmission waiting state in each base station becomes a predetermined state, a part or all of the information in a transmission waiting state is collected; and
the thus-collected information is re-distributed to one or a plurality of base stations as information to be distributed.

33. The method of distributing information in a mobile communication system as claimed in claim 32, wherein:
the collected information is discarded if a time for which the information is piled up without being transmitted to the mobile set is more than a predetermined time when the information is collected.

34. An information distribution control device performing information distribution control for a mobile set in a mobile communication system having a base station and the mobile set, comprising:
base station determining means determining one or a plurality of base stations to perform communication with the mobile set and based on a transmission waiting state of the information to be distributed in each base station; and
information distributing means distributing information to be distributed to the mobile set to the thus-determined one or plurality of base stations,
each base station being able to transmit the information distributed by said information distributing means to the mobile set;
determination means for determining a signal transmission permission criterion is made based on a channel state; and
modification means for making modification of the signal transmission permission criterion according to a transmission waiting state, in such a manner that the transmission permission criterion is made easier as the transmission waiting time is longer, while the transmission permission criterion is made more difficult as the transmission waiting time is shorter.

35. The information distributing control device as claimed in claim 34, wherein:
said base station determining means determines the one or plurality of base stations to perform communication with the mobile set based on a state of a radio channel with the mobile set.

36. The information distributing control device as claimed in claim 34, wherein:

said base station determining means determines the one or plurality of base stations to perform communication with the mobile set based on performance required for transmission of the information to be distributed to the mobile set.

37. The information distributing control device as claimed in claim 34, wherein:
said information distributing means distributes the information to be distributed to the mobile set to the thus-determined one or plurality of base stations without duplication.

38. The information distributing control device as claimed in claim 34, wherein:
said information distributing means copies a part or all of the information to be distributed to the mobile set, and distributes the information to be distributed to the mobile set to the thus-determined one or plurality of base stations with duplication of the part or all of the information.

39. The information distributing control device as claimed in claim 34, wherein:
said information distributing means distributes a larger amount of the information to a base station of the thus-determined one or plurality of base stations which has a smaller amount of information in a transmission waiting state.

40. The information distributing control device as claimed in claim 34, wherein:
said information distributing means distributes a larger amount of the information to a base station of the thus-determined one or plurality of base stations which has a better state of the radio channel with the mobile set.

41. The information distributing control device as claimed in claim 34, wherein:
said information distributing means determines amounts of distributing of the information to the thus-determined one or plurality of base stations based on an amount of information in a transmission waiting state and a state of the radio channel with the mobile set in each base station.

42. The information distributing control device as claimed in claim 41, wherein:
said information distributing means distributes the information to the thus-determined one or plurality of base stations in a manner such that a base station having a better state of the radio channel with the mobile set has a larger amount of information in a transmission waiting state.

43. The information distributing control device as claimed in claim 34, further comprising information collecting means which, when a state of information piled up in a transmission waiting state in each base station becomes a predetermined state, collects a part or all of the information in the transmission waiting state,
said information distributing means re-distributing the thus-collected information to one or a plurality of base stations as information to be distributed.

44. The information distributing control device as claimed in claim 43, further comprising:
information discarding means discarding the collected information if a time for which the information is piled up without being transmitted to the mobile set is more than a predetermined time when the information is collected.

45. A transmitting device in a receiving device in a mobile communication system which transmits a burst signal transmitted from a transmitting station at a transmission power value and/or a transmission rate determined in accordance with a state of a radio channel, comprising:
reception quality measuring means measuring a reception quality from a received signal;
reception-end reference power determining means determining a reception-end reference power in accordance with the measured reception quality;
a signal intensity detector detecting the state of the radio channel;
reception-end permission determining means determining whether or not the transmitting station should transmit the burst signal, based on a transmission waiting state of burst signal and a comparison result between the reception-end reference power and the state of the radio channel;
means transmitting this determination result to the transmitting station;
determination means for determining a sianal transmission permission criterion is made based on a channel state; and
modification means for making modification of the signal transmission permission criterion according to a transmission waiting state, in such a manner that the transmission permission criterion is made easier as the transmission waiting time is longer, while the transmission permission criterion is made more difficult as the transmission waiting time is shorter.

* * * * *